(12) United States Patent
Tang et al.

(10) Patent No.: US 10,648,460 B2
(45) Date of Patent: May 12, 2020

(54) NANOMOTOR PROPULSION

(71) Applicant: The University of Hong Kong, Hong Kong (CN)

(72) Inventors: Jinyao Tang, Hong Kong (CN); Baohu Dai, Hong Kong (CN); Jizhuang Wang, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 472 days.

(21) Appl. No.: 15/370,783

(22) Filed: Dec. 6, 2016

(65) Prior Publication Data

US 2017/0175720 A1    Jun. 22, 2017

Related U.S. Application Data

(60) Provisional application No. 62/268,352, filed on Dec. 16, 2015.

(51) Int. Cl.
    *F03H 3/00* (2006.01)
    *B82Y 20/00* (2011.01)
    *H01G 9/20* (2006.01)

(52) U.S. Cl.
    CPC .............. *F03H 3/00* (2013.01); *B82Y 20/00* (2013.01); *H01G 9/20* (2013.01)

(58) Field of Classification Search
    CPC . F03H 3/00; B82Y 20/00; H01G 9/20; G01N 27/4146
    See application file for complete search history.

(56) References Cited

U.S. PATENT DOCUMENTS

2019/0024246 A1*    1/2019    Yang ................... C25B 11/02

OTHER PUBLICATIONS

Dong et al. ACS Nano, 2016, 10, 839-844 (Year: 2016).*
Wang, J. et al., "Nano/Microscale Motors: Biomedical Opportunities and Challenges", *ACS Nano*, 2012, 6(7):1-8, 2012 American Chemical Society.
Moo, J.G.S. et al., "Chemical Energy Powered Nano/Micro/ Macromotors and the Environment", *Chemistry A European Journal Minireview*, 2015, 21:58-72, 2015 Wiley-VCH Verlag GmbH & Co.KGaA, Weinheim.
Patra, D. et al., "Intelligent, self-powered, drug delivery systems", *Nanoscale*, 2013, 5:1273-1283, The Royal Society of Chemistry 2013.
Jurado-Sánchez, B. et al., "Milli, micro and nanomotors: Novel analytical tools for real-world applications", *Trends in Analytical Chemistry*, 2016, p. 1-12, 2016 Elsevier B.V.
Nain, S. et al., "Propulsion of an artificial nanoswimmer: a comprehensive review", *Frontiers in Life Science*, 2015, 8(1):1-17, 2014 Taylor & Francis.

(Continued)

*Primary Examiner* — Gurpreet Kaur
(74) *Attorney, Agent, or Firm* — Saliwanchik, Lloyd & Eisenschenk

(57) ABSTRACT

Self-propelling, programmable nanoscopic motors capable of harvesting energy from absorbed photons and undergoing subsequent photoeletrochemical (PEC) reactions are provided. A nanomotor can have a three-dimensional Janus configuration and can sense the direction of a light source. By controlling the zeta potential of different parts of the nanomotor with chemical modifications, the nanomotor can be programmed to show either positive phototaxis or negative phototaxis.

20 Claims, 30 Drawing Sheets

(56) References Cited

OTHER PUBLICATIONS

Wang, W. et al., "Small power: Autonomous nano- and micromotors propelled by self-generated gradients", Nano Today, 2013, 8:531-554, 2013 Elsevier Ltd.
Ibele, M. et al., "Schooling Behavior of Light-Powered Autonomous Micromotors in Water," Angew. Chem. Int. Ed., 2009, 48:3308-3312, 2009 Wiley-VCH Verlag GmbH & Co. KGaA, Weinheim.
Paxton, W.F. et al., "Catalytic Nanomotors: Autonomous Movement of Striped Nanorods", Journal of the American Chemical Society, 2004, 126(41):13424-13431, 2004 American Chemical Society.
Jiang, H. et al., "Active Motion of a Janus Particle by Self-Thermophoresis in Defocused Laser Beam", Physical Review Letters, 2010, 105(26):1-4, 2010 The American Physical Society.
Gao, W. et al., "Cargo-Towing Fuel-Free Magnetic Nanoswimmers for Targeted Drug Delivery", Small, 2012, 8(3):460-467, 2012 Wiley-VCH Verlag GmbH & Co. KGaA, Weinheim.
Li, J. et al., "Magneto-Acoustic Hybrid Nanomotor", Nano Letters, Jun. 16, 2015, 15:4814-4821, 2015 American Chemical Society.
Solovev, A.A. et al., "Magnetic Control of Tubular Catalytic Microbots for the Transport, Assembly, and Delivery of Micro-objects", Advanced Functional Materials, 2010, 20:2430-2435, 2010 Wiley-VCH Verlag GmbH & Co. KGaA, Weinheim.
Dong, R. et al., "Highly Efficient Light-Driven $TiO_2$-Au Janus Micromotos", ACS Nano, Nov. 23, 2015, 10:839-844, 2015 American Chemical Society.
Hong, Y. et al., "Light-Driven Titanium-Dioxide-Based Reversible Microfireworks and Micromotor/Micropump Systems", Advanced Functional Materials, 2010, 20:1-9, 2010 Wiley-VCH Verlag GmbH & Co. KGaA, Weinheim.
Chaturvedi, N. et al., "Magnetic Enhancement of Phototaxing Catalytic Motors", Langmuir Article, 2010, 26(9):6308-6313, 2010 American Chemical Society.
Ibele, M.E. et al., "Emergent, Collective Oscillations of Self-Mobile Particles and Patterned Surfaces under Redox Conditions", ACS Nano, 2010, 4(8):4845-4851, 2010 American Chemical Society.
Duan, W. et el., "Motion analysis of light-powered autonomous silver chloride nanomotors", The European Physical Journal E, 2012, 35(77):1-9, EDP Sciences / Società Italiana di Fisica / Springer-Verlag 2012.
Duan, W. et al., "Transition between Collective Behaviors of Micromotors in Response to Different Stimuli", Journal of the American Chemical Society, Jan. 9, 2013, 135:1280-1283, 2013 American Chemical Society.
Giudicatti, S. et al., "Photoactive rolled-up $TiO_2$ microtubes: fabrication, characterization and applications", Journal of Materials Chemistry C, 2014, 2:5892-5901, The Royal Society of Chemistry 2014.
Mou, F. et al., "Single-Component $TiO_2$ Tubular Microengines with Motion Controlled by Light-Induced Bubbles", Small, 2015, 11(21):2564-2570, 2015 Wiley-VCH Verlag GmbH & Co. KGaA, Weinheim.
Solovev, A.A. et al., "Light-Controlled Propulsion of Catalytic Microengines", Angew. Chem. Int. Ed., 2011, 50:10875-10878, 2011 Wiley-VCH Verlag GmbH & Co. KGaA, Weinham.
Cao, L. et al., "Engineering light absorption in semiconductor nanowire devices", Nature Materials, Aug. 2009, 8:1-6, 2009 Macmillan Publishers Limited.
Cao. L. et al., "Semiconductor Nanowire Optical Antenna Solar Absorbers", Nano Letters, 2010, 10:439-445, 2010 American Chemical Society.
Garnett, E. et al., "Light Trapping in Silicon Nanowire Solar Cells", Nano Letters, 2010, 10:1082-1087, 2010 American Chemical Society.
Kelzenberg M.D. et al. "Enhanced absorption and carrier collection in Si wire arrays for photovoltaic applications", Supplementary Information, Nature Materials, 2010, 9:1-13.

Brittman, S. et al., "Absorption of Light in a Single-Nanowire Silicon Solar Cell Decorated with an Octahedral Silver Nanocrystal", Nano Letters, Nov. 14, 2011, 11:5189-5195, 2011 American Chemical Society.
Kim, S. et al., "Tuning Light Absorption in Core/Shell Silicon Nanowire Photovoltaic Devices through Morphological Design", Nano Letters, 2012, 12:4971-4976, 2012 American Chemical Society.
Shyue, J. et al., "Acid-Base Properties and Zeta Potentials of Self-Assembled Monolayers Obtained via in Situ Transformations", Langmuir, Jun. 15, 2004, 20:8693-8698, 2004 American Chemical Society.
Wu, Z. et al., "Near-Infrared Light-Triggered "On/Off" Motion of Polymer Multilayer Rockets", ACS Nano, 2014, 8(6):6097-6105, 2014 American Chemical Society.
Liu, Z. et al., "Small-scale heat detection using catalytic microengines irradiated by laser", Nanoscale, Jan. 2013, 5:1-9, The Royal Society of Chemistry 2013.
Fujimoto, H. et al., "Hydrodynamics and boiling phenomena of water droplets impinging on hot solid", International Journal of Multiphase Flow, 2010, 36:620-642, 2010 Elsevier Ltd.
Xu, T. et al., "Ultrasound-Modulated Bubble Propulsion of Chemically Powered Microengines", Journal of the American Chemical Society, Jun. 4, 2014, 136:8552-8555, 2014 American Chemical Society.
Xuan, M. et al., "Near Infrared Light-Powered Janus Mesoporous Silica Nanoparticle Motors", Journal of the American Chemical Society, May 6, 2016, 138:6492-6497, 2016 American Chemical Society.
Harris, L.B., "Simplified Calculation of Electrophoretic Mobility of Non-Spherical Particles When the Electrical Double Layer is Very Extended", Journal of Colloid and Interface Science, Oct. 1970, 34(2):322.
Moran, J.L. et al., "Role of solution conductivity in reaction induced charge auto-electrophoresis", Physics of Fluids, 2014, 26:1-22, 2014 AIP Publishing LLC.
Paxton, W.F. et al., "Motility of Catalytic Nanoparticles through Self-Generated Forces", Catalytic Movement of Nanoscale Objects, Chemistry A European Journal, 2005, 11:6462-6470, 2005 Wiley-VCH Verlag GmbH Co. KGaA, Weinheim.
Jékely, G. et al., "Mechanism of phototaxis in marine zooplankton", Nature, Nov. 20, 2008, 456:1-6, 2008 Macmillan Publishers Limited.
Jékely, G., "Evolution of phototaxis", Philosophical Transactions of the Royal Society B, 2009, 364:2795-2808, 2009 The Royal Society.
Wakabayashi, K. et al., "Reduction-oxidation poise regulates the sign of phototaxis in Chlamydomonas reinhardtii", PNAS, Jul. 5, 2011, 108(7):11280-11284.
Wu, J. et al., "Motion-based DNA detection using catalytic nanomotors", Nature Communications, Jul. 13, 2010, 1(36):1-6, 2010 Macmillan Publishers Limited.
Wang, J., "Can Man-Made Nanomachines Compete with Nature Biomotors?", ACS Nano, 2009, 3(1):4-9.
Balasubramanian, S. et al., "Micromachine-Enabled Capture and Isolation of Cancer Cells in Complex Media", Angew. Chem. Int. Ed., 2011, 50:4161-4164, 2011 Wiley-VCH Verlag GmbH & Co. KGaA, Weinheim.
Li, J. et al., "Nanomotor lithography", Nature Communications, Sep. 24, 2014, 5(5026):1-7, 2014 Macmillan Publishers Limited.
Hong, Y. et al., "Chemotaxis of Nonbiological Colloidal Rods", Physical Review Letters, Oct. 26, 2007, 19(17):1-5, 2007 The American Physical Society.
Paxton, W.F. et al., "Catalytically Induced Electrokinetics for Motors and Micropumps", Journal of the American Chemical Society, 2006, 128:14881-14888, 2006 American Chemical Society.
Laocharoensuk, R. et al., "Carbon-Nanotube-Induced Acceleration of Catalytic Nanomotors", ACS Nano, 2008, 2(5):1069-1075, 2008 American Chemical Society.
Paxton, W.F. et al., "Catalytic Nanomotors: Autonomous Movement of Striped Nanorods", Journal of the American Chemical Society, 2004, 126:13424-13431, 2004 American Chemical Society.

(56) References Cited

OTHER PUBLICATIONS

Sengupta, S. et al., "Self-powered enzyme micropumps", *Nature Chemistry*, May 2014, 6:415-422, 2014 Macmillan Publishers Limited.
Ma, X. et al., "Catalytic Mesoporous Janus Nanomotors for Active Cargo Delivery", *Journal of the American Chemical Society*, Apr. 6, 2015, 137:4976-4979, 2015 American Chemical Society.
Wilson, D.A. et al., "Autonomous movement of platinum-loaded stomatocytes", *Nature Chemistry*, 2012, pp. 1-7, 2012 Macmillan Publishers Limited.
Wang, W. et al., "Acoustic Propulsion of Nanorod Motors Inside Living Cells", *Angew. Chem. Int. Ed.*, 2014, 53:3201-3204, 2014 Wiley-VCH Verlag GmbH &Co. KGaA, Weinheim.
Kline, T.R. et al., "Catalytic Nanomotors: Remote-Controlled Autonomous Movement of Striped Metallic Nanorods", *Angew. Chem. Int. Ed.*, 2005, 44:744-746, 2005 Wiley-VCH Verlag GmbH & Co. KGaA, Weinheim.
Tottori, S. et al., "Assembly, Disassembly, and Anomalous Propulsion of Microscopic Helices", *Nano Letters*, Aug. 16, 2013, 13:4263-4268, 2013 American Chemical Society.
Friese, M.E.J. et al., "Optical alignment and spinning of laser-trapped microscopic particles", *Nature*, Oct. 8, 1998, 395:1-4, Macmillan Publishers Ltd 1998.
Garcés-Chávez, V. et al., "Simultaneous micromanipulation in multiple planes using a self-reconstructing light beam", *Nature*, Sep. 12, 2002, 419:145-147, 2002 Nature Publishing Group.
Liu, C. et al., "A Fully Integrated Nanosystem of Semiconductor Nanowires for Direct Solar Water Splitting", *Nano Letters*, May 6, 2013, 13:2989-2992, 2013 American Chemical Society.
Kline, T.R. et al., "Reversible Pattern Formation through Photolysis", *Langmuir*, Jul. 7, 2006, 22:7124-7127, 2006 American Chemical Society.
Dreyfus, R. et al., "Microscopic artificial swimmers", *Nature*, Oct. 6, 2005, 437:862-865, 2005 Nature Publishing Group.
Loget, G. et al., "Electric field-induced chemical locomotion of conducting objects", *Nature Communications*, Nov. 15, 2011, 2(535):1-6, 2011 Macmillan Publishers Limited.
Liu, C. et al., "Light-Induced Charge Transport within a Single Asymmetric Nanowire", *Nano Letters*, Jul. 18, 2011, 11:3755-3758, 2011 American Chemical Society.
Hwang, Y.J. et al., "$TiO_2$ Nanowire Arrays: A Study of the Dependence on Length and Atomic Layer Deposition Coating", *ACS Nano*, 2012, 6(6):5060-5069, 2012 American Chemical Society.
Nultsch, W., In: M.J. Charlile (Ed.), "Phototaxis and photokinesis", *Primitive Sensory and Communcation Systems*, 1975, pp. 29-90, Academic Press.
Gibbs, J.G. et al., "Self-Organized Multiconstituent Catalytic Nanomotors", *Small*, 2010, 6(15):1656-1662, 2010 Wiley-VCH Verlag GmbH & Co. KGaA, Weinheim.

\* cited by examiner

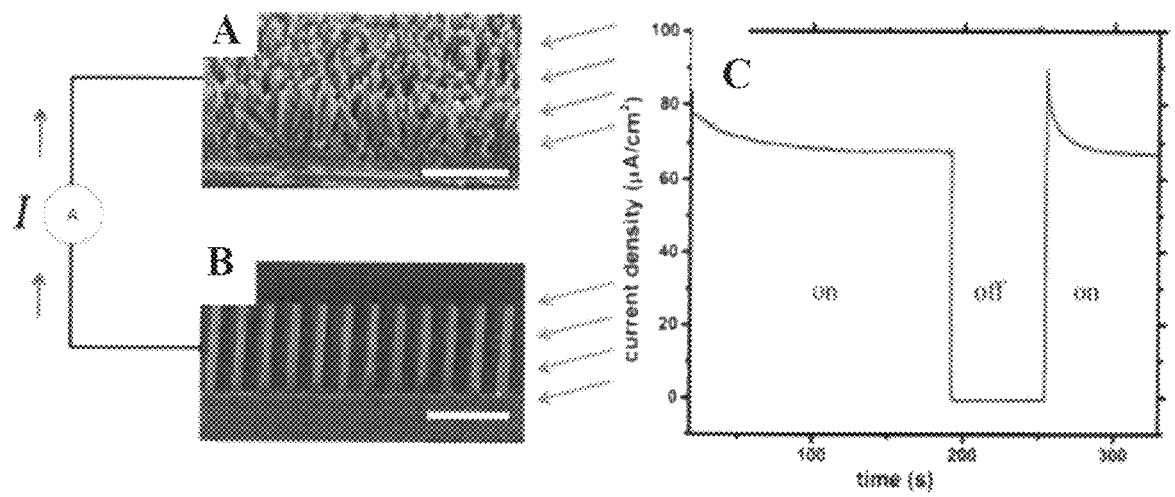
FIG. 5A-C
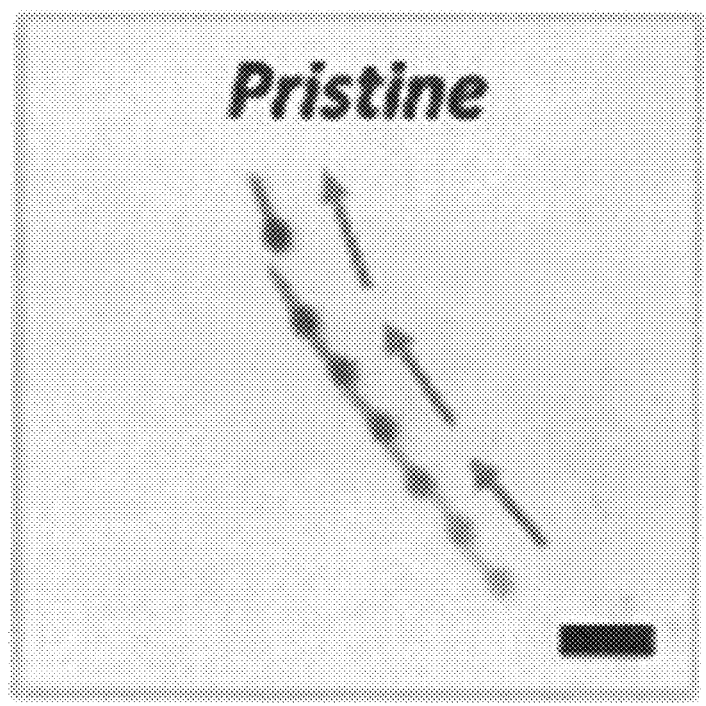
FIG. 6A

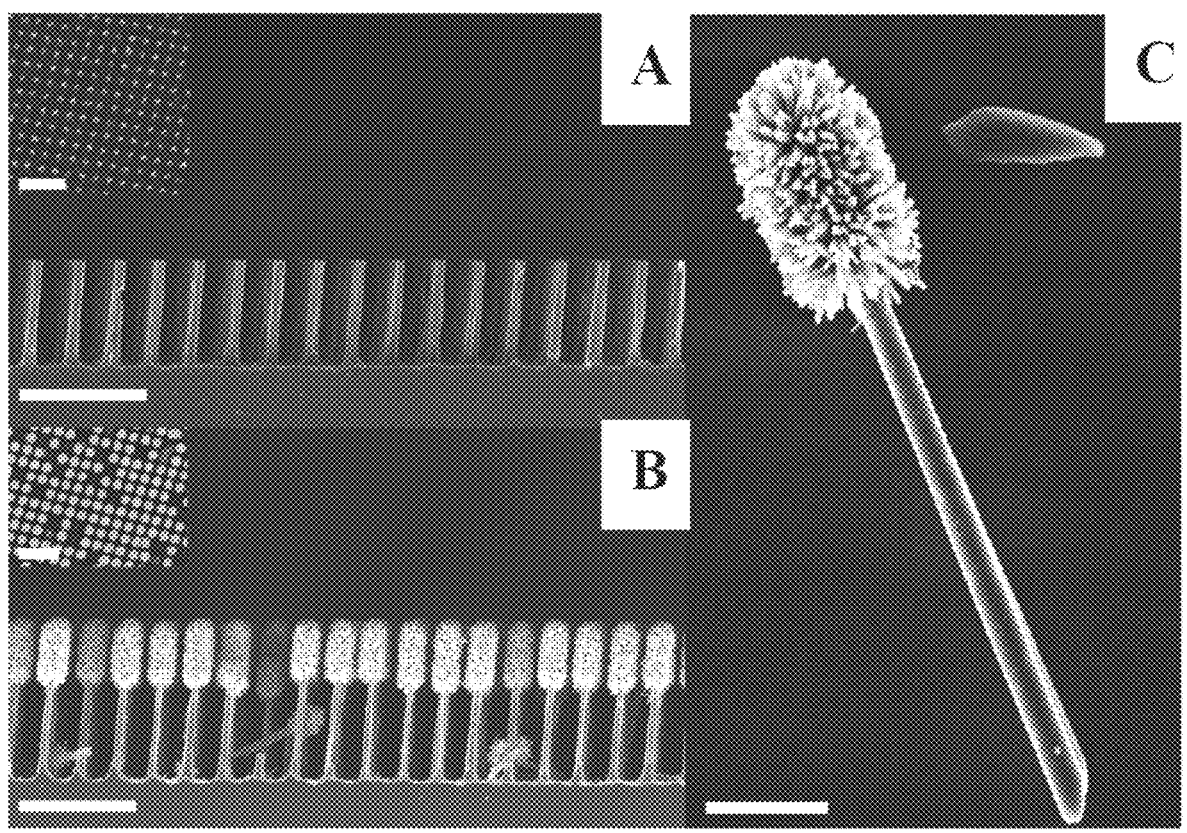
FIG. 10A-C

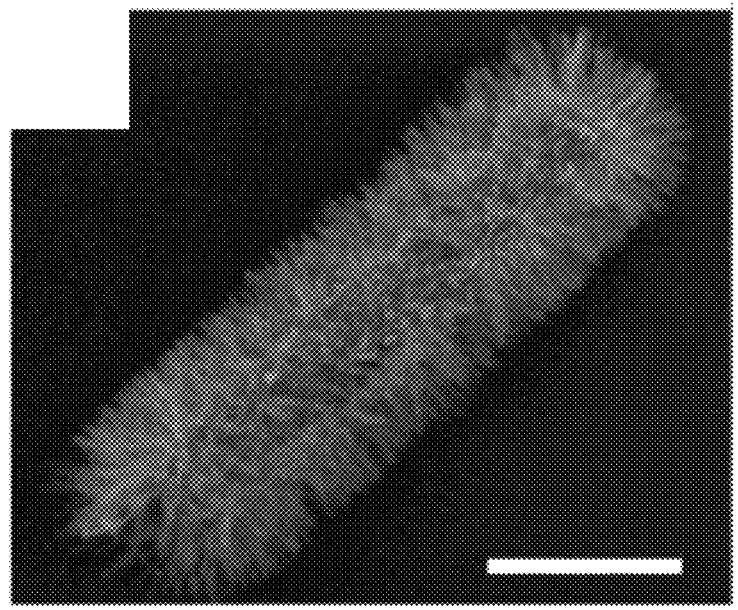
FIG. 13D
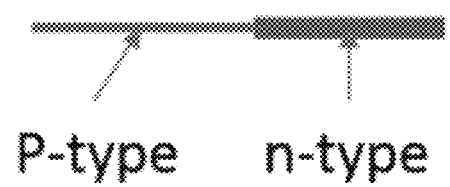
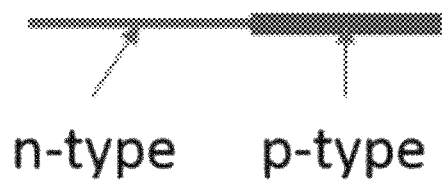
FIG. 14A

NANOMOTOR PROPULSION

CROSS-REFERENCE TO RELATED APPLICATION

This application claims the benefit of U.S. Provisional Application Ser. No. 62/268,352, filed Dec. 16, 2015, which is hereby incorporated by reference in its entirety, including any figures, tables, or drawings.

BACKGROUND OF THE INVENTION

Nano- and micro-motors used in biomedical applications and many low-cost nanofabrication processes typically comprise a variety of micro and/or nanoparticle composites capable of propelling towards or away from a source field. Inorganic nanomotors based on different propelling mechanisms including, for example, self-electrophoresis, self-diffusiophoresis, bubble propelling, and self-acoustophoresis, have been demonstrated in the past.

To remotely control nano- and micro-motors, the use of ferromagnetic materials has been commonly incorporated in the motors and can be steered and/or directed in response to an external magnetic field. On the other hand, optical manipulation such as optical tweezers has also been found useful in controlling nanoscale machines since optical field can be designed and manipulated with better precision and accuracy. Collective phototactic behavior has been observed in synthetic inorganic Janus nanoparticles, which suggested the potential of designing optically controlled nanorobots. However, in order to design fully functional nanorobots based on phototaxis phenomenon, it is critical to design individual nanomotors whose motion can be tuned and programmed.

BRIEF SUMMARY

Embodiments of the subject matter relate generally to self-propelling nanomotors. Embodiments of the subject invention provide nano- and microscopic motors capable of harvesting energy from absorbed photons and undergoing subsequent photoeletrochemical (PEC) reactions.

In some embodiments, nanomotors having a three-dimensional Janus configuration (known as a Janus nanotree) are provided and can sense the direction of a light source. By controlling the zeta potential of different parts of the Janus nanotree with chemical modifications, the Janus nanotrees can be programmed to show either positive phototaxis or negative phototaxis.

In further embodiments, nanomotors can comprise silicon nanowires with p-n junctions. Similar to its Janus nanotree counterpart, silicon nanowire-based nanomotors can be propelled by self-electrophoresis mechanism. In a particular embodiment, the particular structure of the silicon nanowires can change the nanomotor migration trajectory.

In some embodiments, the nanomotors can be readily propelled by visible, infrared, and ultraviolet illumination at various intensity levels. Advantageously, nanomotors provided herein can be propelled to a high speed by ultra-low light intensity desirable for applications in biological systems.

Advantageously, devices and methods provided herein are promising for designing individually light-controlled, reversible, and wireless nano- and micro-machines to be used in applications such as, for example, biomedicine, catalysis, and environmental remediation.

BRIEF DESCRIPTION OF THE DRAWINGS

In FIG. 1C, selected area electron diffraction pattern of the $TiO_2$ nanowire (upper right inset) and the silicon nanowire (lower left inset) indicate that both materials are single crystalline. The scale bars are 10 μm (1B) and 2 μm (1C), respectively.

FIG. 3A is a schematic diagram of a Janus nanotree according to an embodiment of the subject invention under side illumination, while

FIGS. 5A and 5B are SEM images of $TiO_2$ nanowires and a silicon nanowire array, respectively, according to embodiments of the subject invention, while FIG. 5C shows a plot of measured photocurrent.

FIGS. 6A-6D are optical images showing trajectories of various Janus nanotrees according to embodiments of the subject invention with a pristine surface (6A) and with different surface treatments: AEEA (6B), platinum (6C), and CSPTMS (6D).

FIGS. 10A-10C shows a method of preparing a silicon-$TiO_2$ Janus nanotree according to an embodiment of the subject invention. FIG. 10A shows cross-section and top-view (inset) SEM images of a silicon nanowire array. FIG. 10B shows cross-section and top-view (inset) SEM images of a Janus nanotree array on silicon substrate. FIG. 10C is an SEM image of an individual Janus nanotree. Scale bars are 10 μm (10A and 10B) and 2 μm (10C), respectively.

FIG. 13D is the nanowire shell dispersed in solution, drop-casted on silicon wafer, and dried naturally. Scale bars are 2 μm in both 13C and 13D.

FIG. 14A is a schematic of a one-dimensional Janus wire swimmer with a p/n junction.

FIG. 15A is a schematic diagram of the light-driven nanomotor. $n^+$-Si (green) shell is formed on p-Si core (red) by thermal diffusion doping phosphorous. p-Si is only exposed at one end of the wire, and platinum (black) particles are deposited on the surface as an electrocatalyst. Upon illumination, photoexcited carriers decompose $H_2O_2$ on p- and $n^+$-Si surface and generate $H^+$ and OFF ions, respectively. The electric field generated by unbalanced ions in turn propels the charged motor. FIG. 15B illustrates schematically a $n^+$/p-Si (phosphorus doped p-type silicon wire) and a p-Si nanowire as photoelectrodes. When the two electrodes are electrically connected, immersed in $H_2O_2$ and sodium sulfate solution, and illuminated, a nonzero photocurrent flows from $n^+$/p- to p-Si to decompose $H_2O_2$. FIG. 15C shows a plot of short-circuit current measurement under chopped light exposure to test the stability of the nanowire photoelectrodes, where LED flash light with power intensity of 35.0 mW/cm$^2$ is used as the light source. FIG. 15D shows a numerical simulation of the charge density (color map) and electric field (streamlines, blue and red represent high and low potential, respectively). FIG. 15E is a scanning TEM image of a nanomotor according to an embodiment of the subject invention. Inset: a selected area electron diffraction pattern indicating the single crystalline nature of silicon. Scale bar: 500 nm.

FIG. 16A is a superimposed image of sequential frames showing the motion of a single nanomotor from 0 s to 10 s under visible light. The scale bar is 20 μm. FIG. 16B is a plot of migration speed as a function of time of a nanomotor according to an embodiment of the subject invention under chopped light illumination. The light intensity of the "ON" state is 176.2 mW/cm$^2$. FIG. 16C shows that the speed of the nanomotor scales linearly with light intensity. FIG. 16D is a plot of normalized migration speed versus solution conductivity of both the experiment data (black square points) and the theoretical curve (red dash line, extracted from Moran J L, Posner J D. Role of solution conductivity in reaction induced charge auto-electrophoresis. Physics of Fluids 26, 042001 (2014)). Inset: normalized migration speed versus resistivity of the experiment data (black square points) and linear fitted line (red line).

FIGS. 17A-17C are superimposed images of sequential frames of nanomotors with motion trajectories in different directions according to embodiments of the subject invention. The scale bar is 20 μm in each image. FIGS. 17D-17F are SEM images of different p-type end-fractured surfaces. The scale bar is 500 nm in each of these images. FIGS. 17G-17I illustrate numerical simulation of charge density (color) and electric field (streamlines) of different shapes of end-fractured surface. The arrow schematically denotes the direction of the repelling force exerted on the end fracture by positively charged ions.

FIG. 18A is a plot of the experimental migration speed normalized by the number of photons at corresponding wavelength and light absorption calculated by FDTD for the nanomotor with an experimental diameter of 909 nm. Insets: absorption mode profiles of absorption peaks denoted by numbers in the simulated absorption spectrum. FIG. 18B is a FDTD simulated absorption plot of the nanomotor diameter as a function of wavelength.

DETAILED DESCRIPTION

Figure 1A:
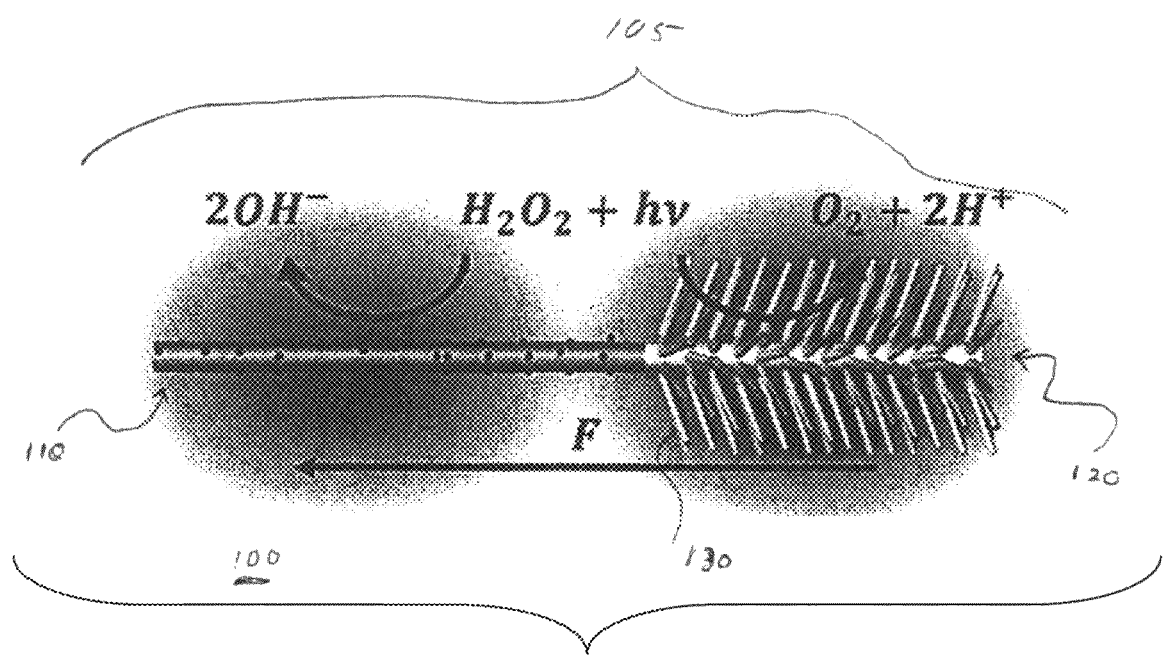
FIG. 1A is a schematic illustrating a nanomotor (e.g., a Janus nanotree) according to an embodiment of the subject invention, capable of autonomous propulsion in response to a stimulus.

As used herein, the terms "coupled" and "connected" are used generically. It should be understood that these terms are not intended to be synonyms. "Coupled" and "connected" can both be used generically to indicate that two or more components, for example, are in direct physical, including electrical contact. However, "coupled" can also be used generically to mean that two or more components are not necessarily in direct contact, but nonetheless are able to co-operate and/or interact.

"Cargo loading" refers to directed capture, transport, and/or release of materials using a nanomotor and/or a micromotor. A micromotor and/or nanomotor refers to a machined structure of one or more materials on an approximately micro- or nano-sized scale capable of executing a trajectory, such as via a directed source driver. Optical sources are able to induce motive fields, e.g., an electromagnetic field, via a photoeletrochemical reaction using synthetic inorganic nanoparticles. As provided herein, micromotors and nanomotors can be chemically loaded with cargo materials for applications in drug delivery, nanosurgery, and nanosensors.

The terms "micro" and "nano" are used generically to refer to the size of one or more components in a machine process ranging from approximately nanometers to approximately microns. Exemplary machine processes include, but are not limited to, silicon micromachining and carbon nanotube manufacturing. However, if these terms are combined with a unit of length, they provide measures specific to the length scale in accordance with the unit. A nanoparticle as provided herein is typically on the order of 1 to 100 nanometers. An embodiment of the subject invention provides platinum nanoparticles embedded in a silicon nanowire.

A "wire" refers to a cylinder-like, or substantially cylinder-like, structure having a length substantially larger than its diameter. The longer dimension corresponds to a z-axis. A radial dimension, the r-axis, can be used to describe a substantially centrosymmetric wire. If the wire has a substantially circular cross-section in a direction substantially perpendicular to its z-axis, the wire can be described by an additional dimension θ, which is substantially constant for a circular cross-section. For embodiments provided herein, silicon nanowires are assumed to be approximately 10 μm in length and 50 nm in radius, although the claimed subject matter is not limited to these dimensions.

A motor (e.g., a nano- or a micromotor) as provided herein comprises a machined structure (e.g., with sizes in the range from approximately nanometers to approximately microns). The motor can be moved by an external driving force, comprising one or more of the following source of energy: mechanical, thermal, electrical, chemical, magnetic, and electromagnetic. An energized motor may perform work to accomplish a task. In an embodiment, a nanomotor can be propelled and at least partially directed along a trajectory. Moreover, the nanomotor can be combined with a cargo loading to be further propelled and at least partially directed along the same or a different trajectory.

As provided herein, the capability to generate and direct the motion of a nanomotor (or a micromotor) is therefore desirable. In some embodiments, photoelectrochemical energy can be generated by combining a light source and a coupling fluid. While a variety of light sources can be used in embodiments provided herein, visible light and UV radiation are preferred sources. In some embodiments, the wavelength of the incident light can range from approximately UV-A1 (approximately 340 nm in wavelength) to approximately Near-IR (approximately 1400 nm in wavelength).

One challenge in constructing a nanomotor is to determine the appropriate mechanism for producing propulsion in, for example, a fluid environment. Another challenge is to determine a method to remotely control the motion of the nanomotor during propulsion in response to an external stimulus.

Embodiments of the subject invention provide micro- and nanoscopic motors that are driven by photons and, in some embodiments, have wavelength-dependent behavior. In an embodiment, a biphasic nanomotor can be capable of producing motion under the influence of a light source, which generates a spatial distribution of ions within and around the nanomotor in the presence of a coupling fluid.

As used herein, the term "coupling fluid" refers to a fluid that is able to couple energy from a source, such as a light source, to a nanomotor via a chemical reaction (e.g., a photoelectrochemical reaction), so as to generate motion by the nanomotor. In some embodiments, the coupling fluid comprises a solution that is capable of supporting a redox reaction and the exchange of charged ions. In an embodiment, the coupling fluid is hydrogen peroxide ($H_2O_2$), though the subject invention is not limited thereto. Other redox shuttles such as benzoquinone/hydroquinone can also be employed as the coupling fluid.

In an embodiment, a nanomotor having a substantially biphasic shape and composition is termed a Janus nanotree. FIG. 1A is a schematic diagram showing an embodiment 100 comprising a Janus nanotree 105 in the presence of a coupling liquid (e.g., $H_2O_2$), in which ions are generated when the nanotree is stimulated by a light source. In particular, propelling force is generated by a spatially varying potential along the surface of the nanotree and in its surrounding coupling fluid.

A Janus nanotree 105 (FIG. 1A) can be geometrically described by a trunk 110 connected with a collection of branches 120, such that the diameter of a substantially cylindrical volume filled by the collection of branches 120 is substantially larger than the diameter of the trunk 110. Each individual branch 130 connects to a portion of the trunk at various acute angles, and the length of each branch approximates the radius of the substantially cylindrical volume formed by the collection of branches 120.

In some embodiments, the Janus nanotree comprises at least two distinct materials within its biphasic structure 105.

Figure 1B:
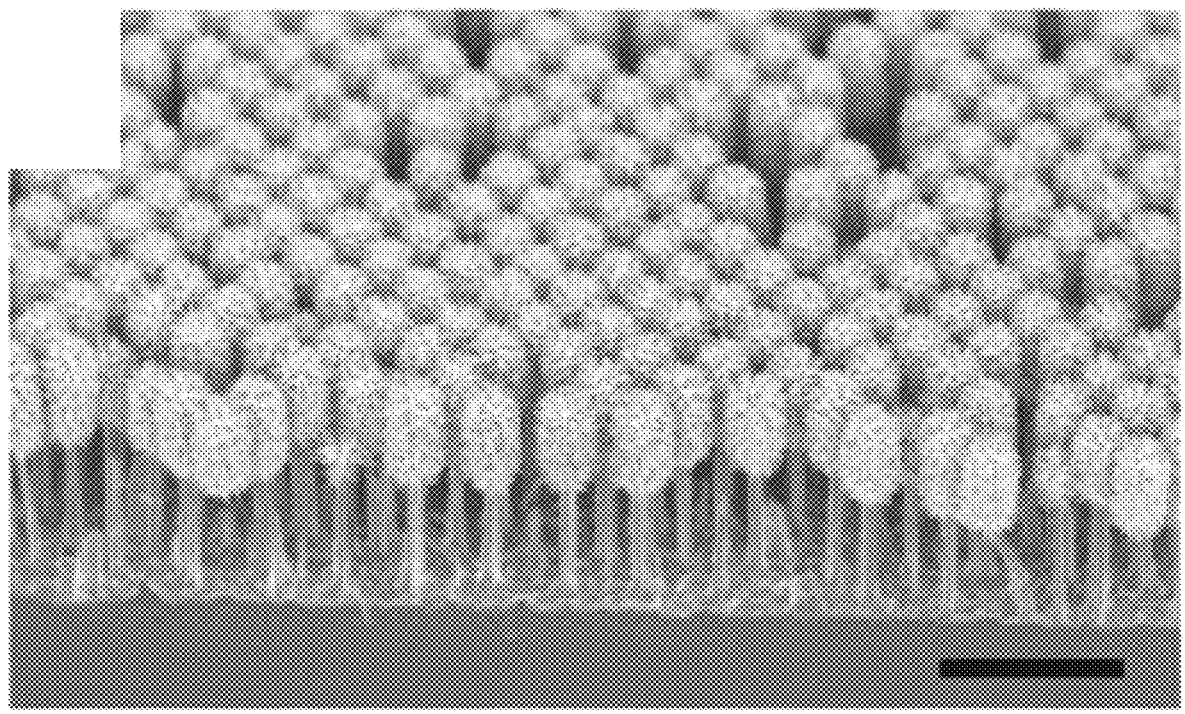
FIG. 1B is a false-colored SEM image of a Janus nanotree forest prepared on a silicon wafer.
Figure 1C:
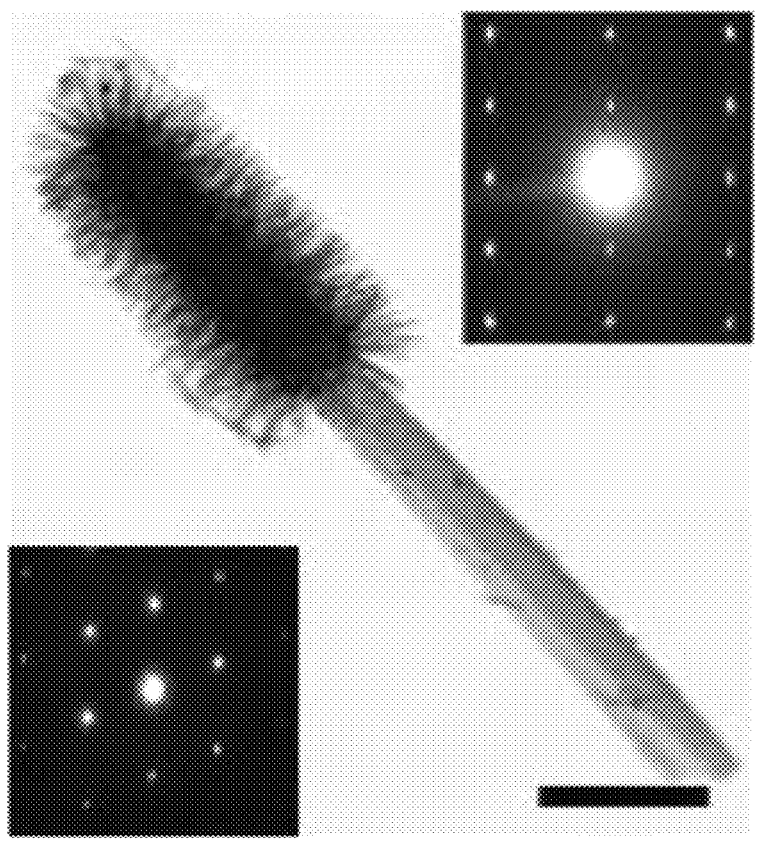
FIG. 1C is a scanning TEM image of an individual Janus nanotree.

As illustrated in FIGS. 1A-1C, an embodiment of the subject invention provides a Janus nanotree comprising titanium dioxide ($TiO_2$) nanowires as the individual branches 130, forming an array of branches 120 connected to a p-type silicon nanowire as the trunk 110. Further, the trunk 110 is embedded (via, for example, chemical deposition or sputtering) with a plurality of platinum nanoparticles 140, which serve as a photoelectric catalyst.

Figure 6B:
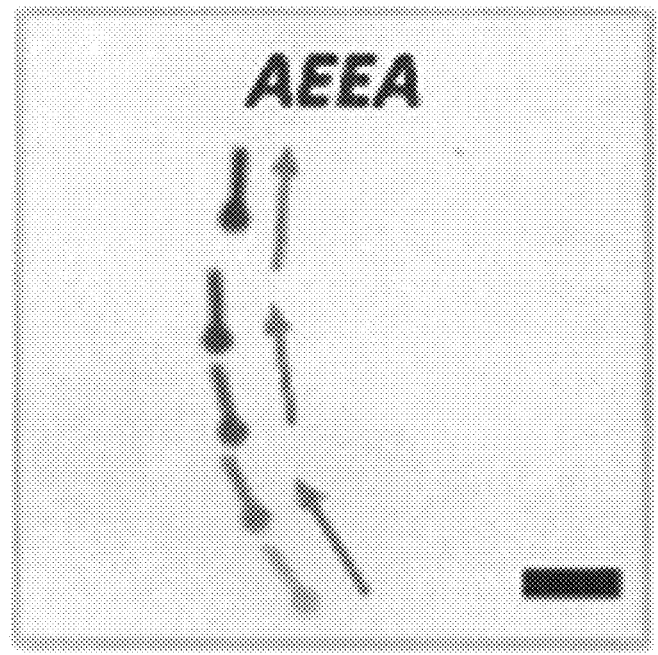
Figure 6C:
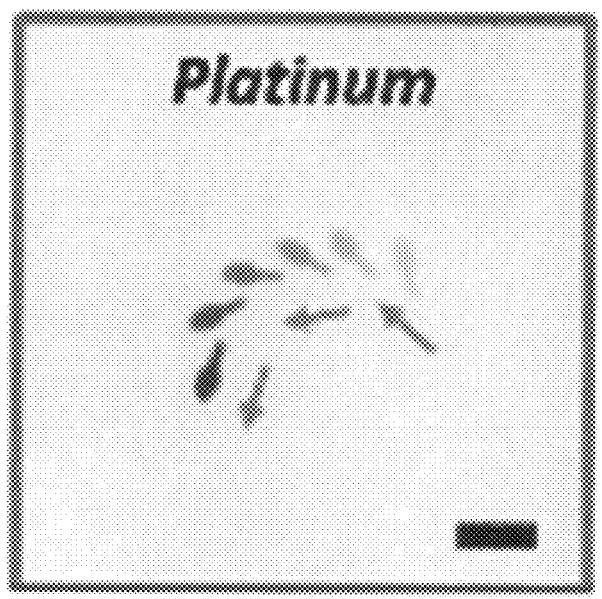
Figure 6D:
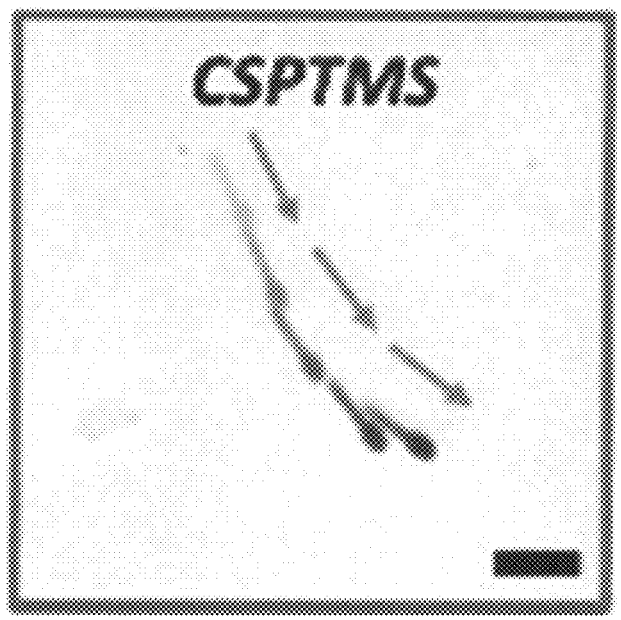

Upon illumination, photoexcited holes in the $TiO_2$ branches and photoexcited electrons in the silicon trunk migrate to the semiconductor-electrolyte interface and decompose $H_2O_2$ by the PEC reactions described in Equations 1-3, generating positively charged protons ($H^+$) and negatively charged hydroxide ions ($OH^-$), respectively. This PEC reaction generates electrical current flow inside and around nanotree as confirmed by PEC cell measurement on separated $TiO_2$ photoanode and silicon photocathode. While the charge inside the nanotree can be quickly balanced through conductive Si and $TiO_2$ nanowire, the low mobility of ions in the coupling fluid prevents quick charge rebalancing and allows the electric field built-up around the nanotree. As a result, charged Janus nanotree migrates via electrophoresis in this self-generated electric field and subsequently generates autonomous motion (see, for example, FIG. 6A).

Overall: $2H_2O_2(aq) \rightarrow 2H_2O(l) + O_2(g)$,  [1]

Anode (p-type): $H_2O_2(aq) \rightarrow 2H^+(aq) + O_2(g) + 2e^-$,  [2]

Cathode (n-type): $H_2O_2(aq) + 2e^- \rightarrow 2OH^-(aq)$,  [3]

Figure 15A:
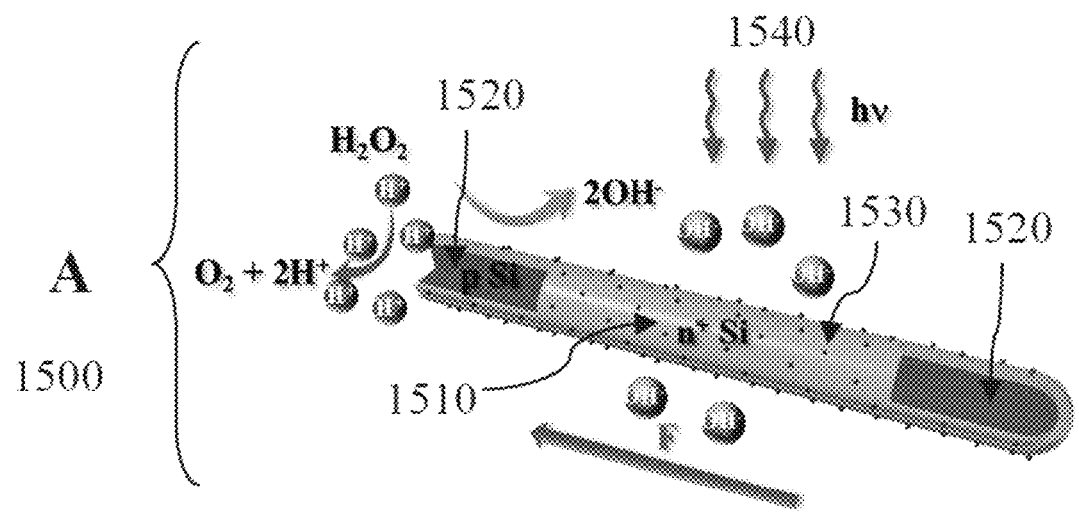
FIGS. 15A-15E show schematic diagrams and structure characterizations of a nanomotor according to an embodiment of the subject invention.
Figure 15B:
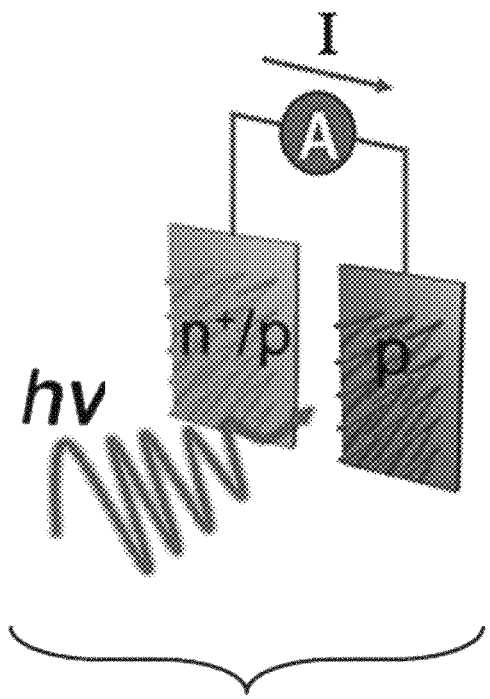
Figure 15C:
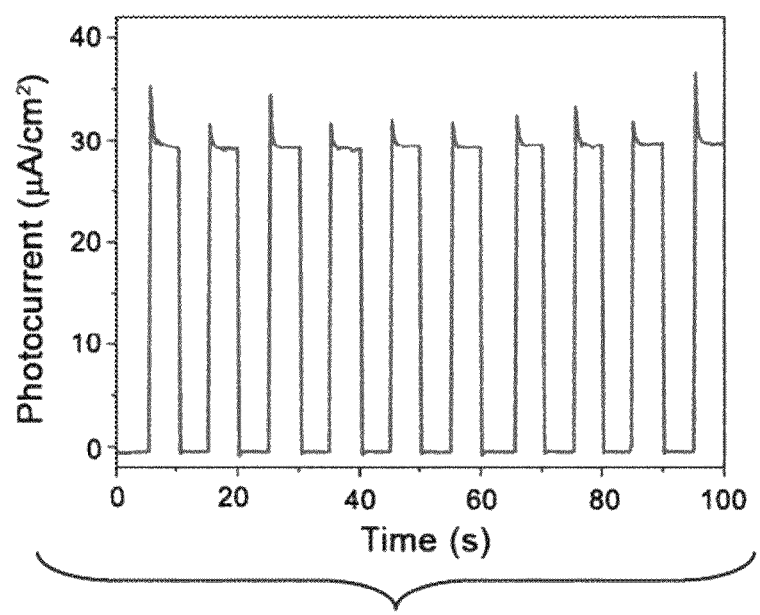
Figure 15D:
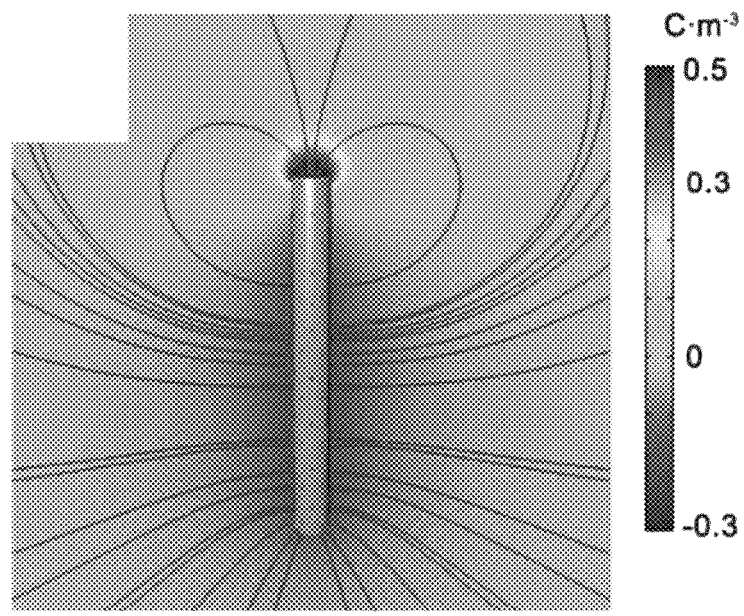

Referring to FIGS. 15A-15E, a further embodiment provides a nanomotor having the structure of a core-shell silicon nanowire that comprises p-n junctions. FIG. 15A shows the schematic diagram of the nanomotor, wherein the $n^+$-Si shell 1510 (photoanode; see, for example, FIG. 15B) is formed on the surface of boron-doped p-type silicon nanowire 1520 (photocathode; see, for example, FIG. 15B) through methods such as, for example, thermal diffusion doping of phosphorous, after which the p-Si is only exposed at one end of the nanowire. On the surface of the $n^+$-Si shell, platinum particles 1530 are deposited as a photoelectric catalyst.

Upon the illumination of an incident light 1540, photoexcited electron-hole pairs are generated at the p-n junctions. Because of the band-bending at the junction, the photogenerated electrons can be transported to the $n^+$-Si shell and reduce $H_2O_2$ to negatively charged hydroxide ions ($OH^-$), while the photogenerated holes are transported to the p-type core exposed at the end surface and oxidize $H_2O_2$ to positively charged protons ($H^+$). The PEC reactions are the same as those described by Equations 1-3.

In some embodiments, photochemical reactions generated on and in the vicinity of the nanomotors create charge gradient. In an embodiment, the resulting charge distribution can be simulated using COMSOL multi-physics (results shown in FIG. 15C). The low mobility of $H^+$ and $OH^-$ in the redox coupling fluid inhibits quick charge rebalance, thus generating electric field built-up around the nanomotor, facilitating the autonomous migration of the negatively charged nanomotor via electrophoresis.

In certain embodiments, large-scale fabrication of nanomotors, particularly nanowires, can be done by low-cost methods based on photolithography and metal-assisted electroless chemical etching process. In an embodiment, silicon nanowire arrays prepared in large-scale fabrication can have lengths on the order of approximately 10 µm and diameters tunable from about 300 nm to about 1 µm.

Figure 15E:
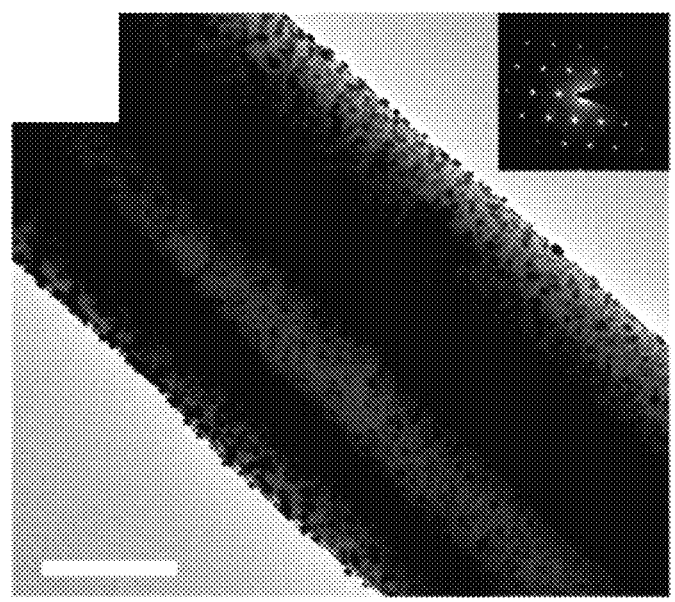

In some embodiments, the silicon employed in the fabrication of nanomotors provided herein is single-crystalline (as illustrated in FIG. 15E) and the platinum nanoparticles are uniformly dispersed on the surface of the silicon.

In some embodiments, other catalysts such as, for example, noble metals (e.g., Au, Ag, and Pd) and oxides (e.g., iridium oxide, nickel oxide, and ruthenium oxide) can also be used. In certain embodiments, the use of a catalyst is optional. In further embodiments, a catalyst can be used to improve one or more material properties of the nanomotor. For example, Pt catalyst employed in a Janus nanotree can provide ohmic contact between the titanium dioxide ($TiO_2$) branches and the silicon trunk to improve the electrical conductivity within the nanotree.

As an advantageous feature of embodiments of the subject invention, differences in material composition of the nanomotors provided herein can be employed to support asymmetric PEC effects, which can result in spatially varying charge distributions along a body axis of the nanomotor. In some embodiments, these asymmetric charge distributions can provide propulsion force (described by vector F in FIGS. 1A and 15A) guided by an incident light.

In some embodiments, ultraviolet (UV) light-emitting diode can be used as a light source. Alternatively, visible light source can also be utilized to produce autonomous propulsion in nanomotors provided herein.

A redox coupling fluid such as hydrogen peroxide ($H_2O_2$) can be used as both an electron and a hole scavenger to provide relatively fast reaction kinetics. Without illumination, $H_2O_2$ decomposition reaction on the surface of a nanomotor is largely negligible, in which case the nanomotor, such as the Janus nanotree 330 in FIG. 3A, behaves as a Brownian particle.

Figure 2:
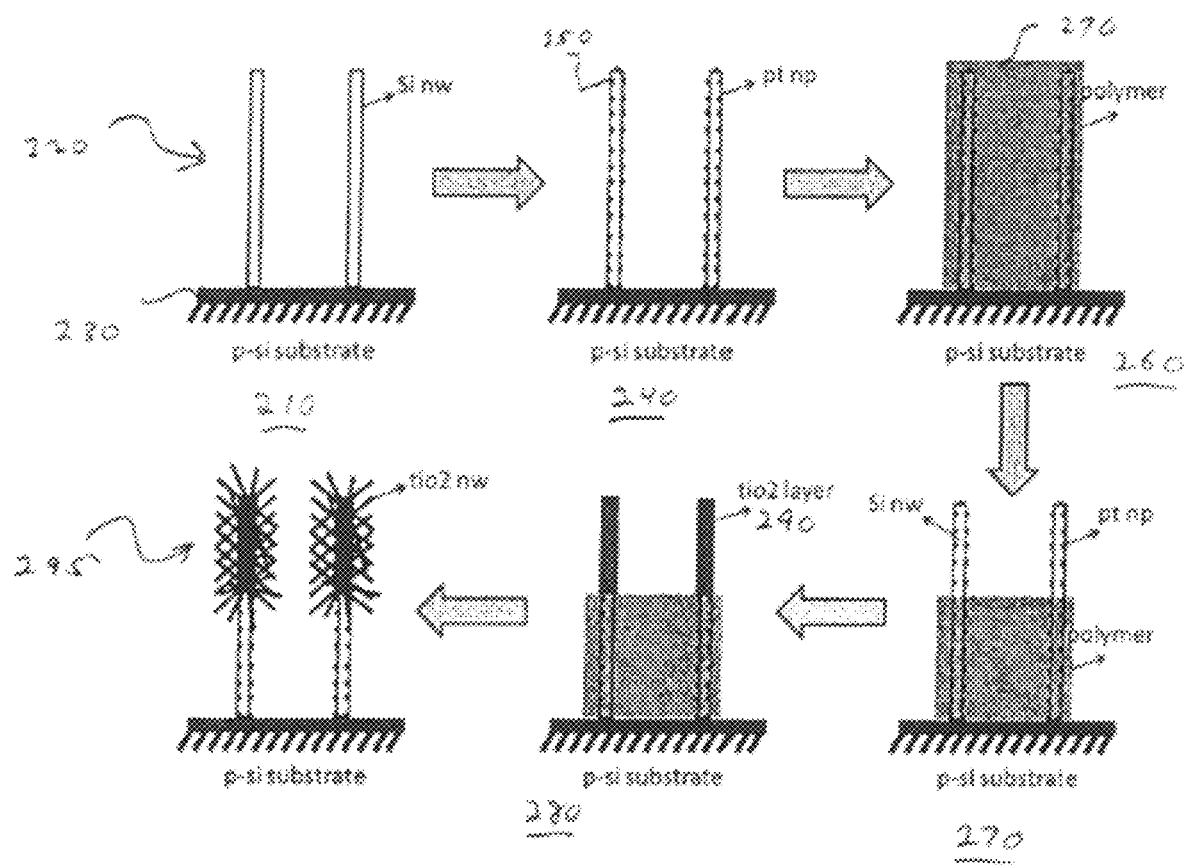
FIG. 2 illustrates a method of fabricating a Janus nanotree according to an embodiment of the subject invention.

FIG. 2 shows a method of fabricating a Janus nanotree according to an embodiment of the subject invention. Embodiments of fabricating a Janus nanotree are not limited to the method illustrated in FIG. 2. Referring to FIG. 2, in 210, an array of silicon nanowires 220 is supported on a p-type silicon substrate 230, which can be produced by commonly known semiconductor microfabrication processes including, for example, photolithography and etching. Further, Pt nanoparticles with an average diameter on the order of about 0.9 µm and a pitch of approximately 3 µm pitch can be produced on the surface of the silicon nanowire trunk.

In 240, Pt nanoparticles 250 are loaded on the surface of the silicon nanowires by, for example, immersing the nanowires in a solution comprising chloroplatinic acid and HF. In some embodiments, the Pt loading process can be repeated up to 5 times. The Pt-loaded silicon is subsequently annealed in vacuum to form platinum silicide.

In 260, Pt nanoparticle embedded silicon nanowires is drop-cast with poly(methyl methacrylate) (PMMA) in an organic solvent such as, for example anisole. After slow evaporation of solvent in a sealed box (270), filled PMMA is at least partially removed by oxygen plasma to expose silicon nanowires of a desired length. After dipping in diluted HF to remove native oxide on the silicon nanowire, the silicon nanowire is loaded into an atomic layer deposition (ALD) chamber.

In an embodiment, a $TiO_2$ seed layer is coated on an exposed surface of the nanowire using tetrakis(dimethylamino)titanium (TDMAT) as a precursor. The silicon structure is then annealed to remove residual PMMA and to crystallize an amorphous $TiO_2$ layer 290, as shown in 280. Finally, the $TiO_2$ nanowires are grown from a growth solution comprising DI water, HCl, and titanium isopropoxide in an autoclave.

Figure 3A:
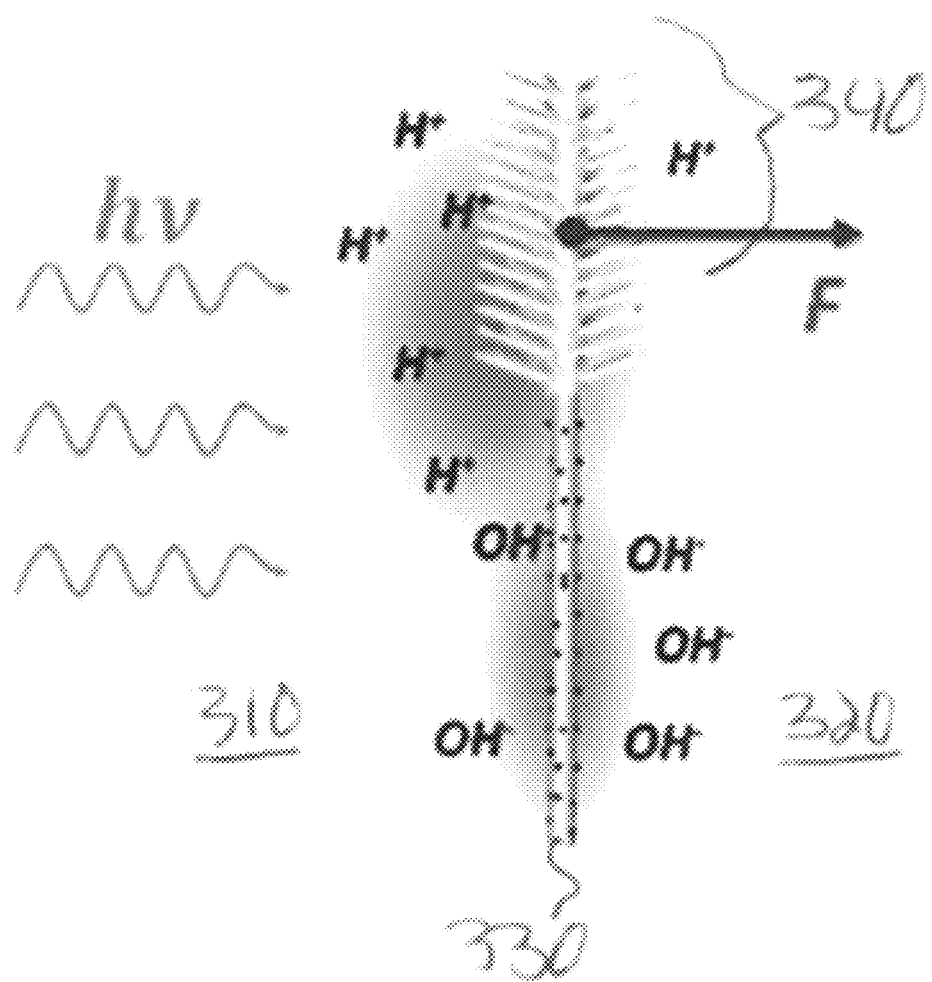
Figure 3B:
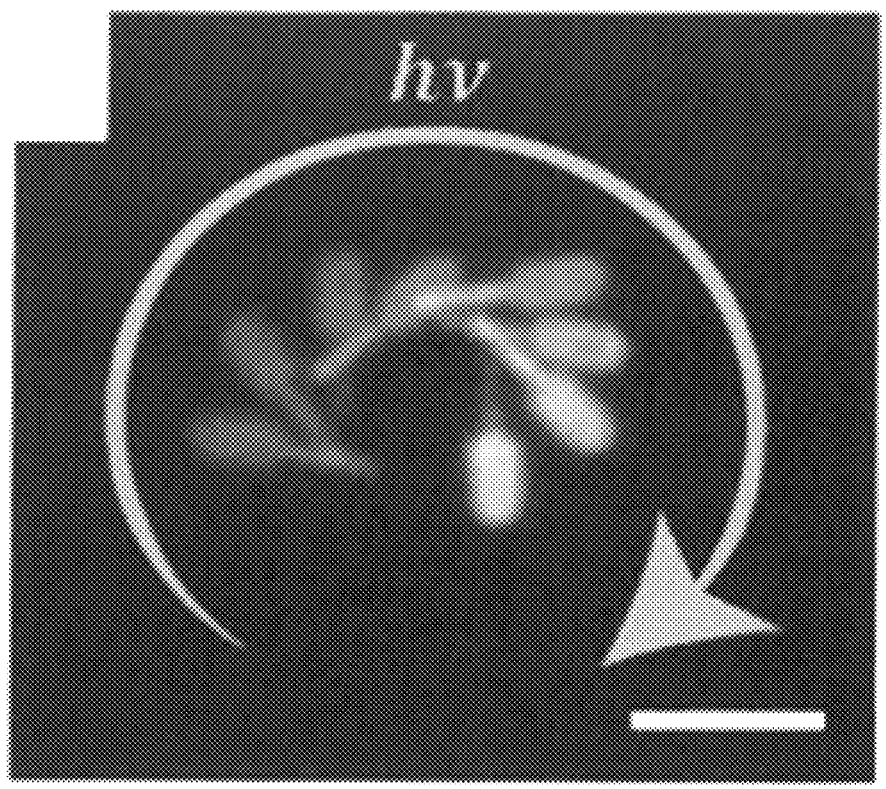
FIG. 3B is an optical image illustrating the torque motion of the Janus nanotree.

FIGS. 3A-3B illustrate side illumination of a Janus nanotree according to an embodiment of the subject invention, in which asymmetry of a PEC reaction between an illuminated side 310 and a shaded side 320 generates an electric field substantially perpendicular to the long axis of the nanotree 330. FIG. 3A illustrates a mechanism for sensing and alignment in the nanotree, in which a torque, F, is exerted on the nanotree from side illumination. For an absorption length of approximately 1 µm, an array of $TiO_2$ branches on the illuminated side 310 receives more photons and, thus, produces more PEC reaction products ($H^+$ in this case) than the shaded side 320. An unbalanced $H^+$ distribution can create an electrophoretic force on the nanotree's $TiO_2$ head 340. As such, the $TiO_2$ head 340 is positively charged, and the generated electric field rotates the nanotree 330 and pushes it away from the light source.

In some embodiments, the exposed silicon trunk of the Janus nanotree 330 can also produce PEC reaction products ($OH^-$ in this case) and in turn provide additional torque. However, because the diameter of the silicon trunk is much smaller than the size of the $TiO_2$ head, a higher diffusion flux is produced in the trunk that can balance a distribution of ions more quickly. As a result, the rotation of the nanotree is primarily driven by the head 340. FIG. 3B is a superimposed image of sequential frames of the nanotree following illumination.

Figure 11A:
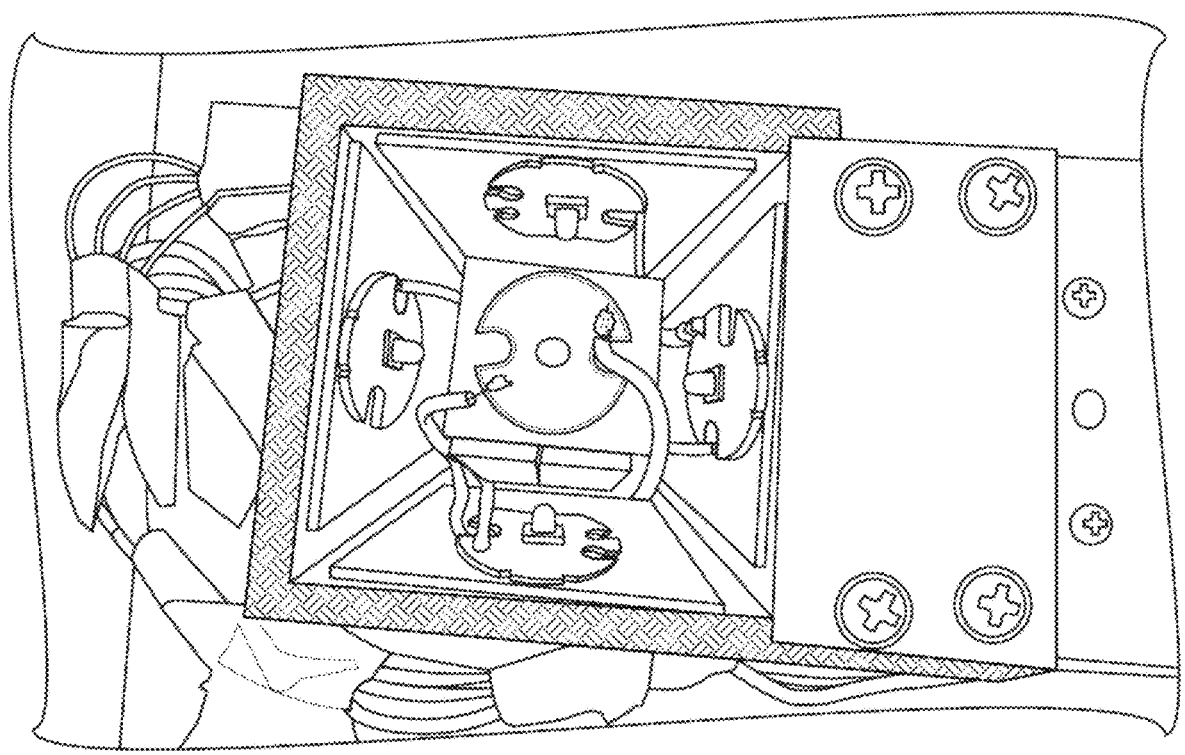
FIGS. 11A-11B are images of a testing stage with five 365-nm LED beads in top view (11A) and side view (11B). One XYZ micropositioning stage is seen mounted beside the LED stage to fix glass slide sample holder.
Figure 11B:
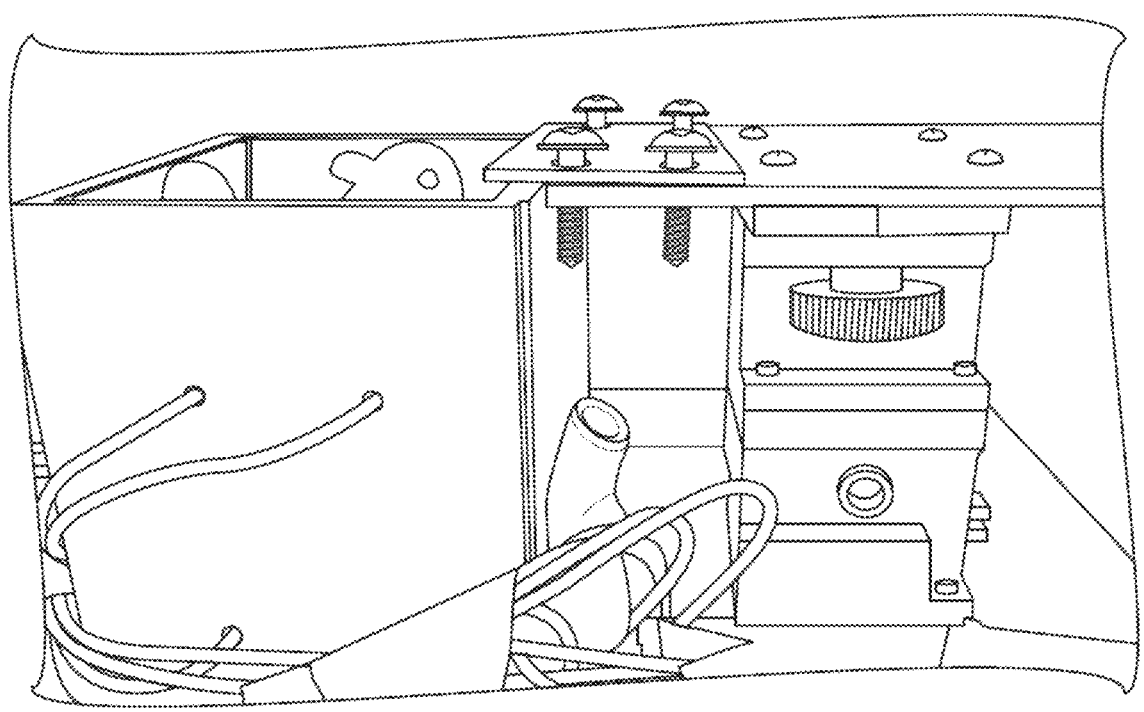
Figure 12A:
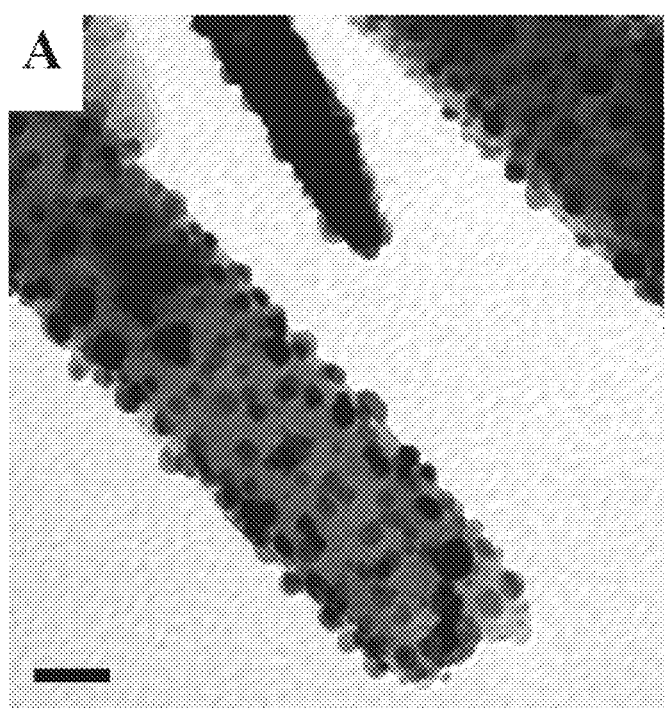
FIGS. 12A-12B are TEM images of platinum nanoparticles deposition on $TiO_2$ nanowires by thermal decomposition of chloroplatinic acid with a scale bar of 20 nm (12A) and 100 nm (12B), respectively.
Figure 12B:
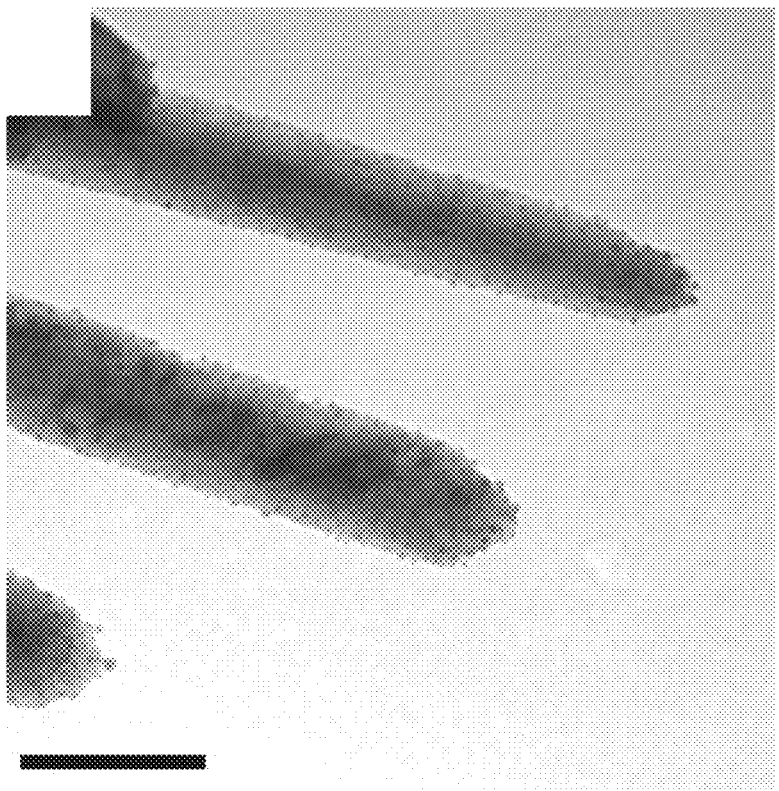
Figure 13A:
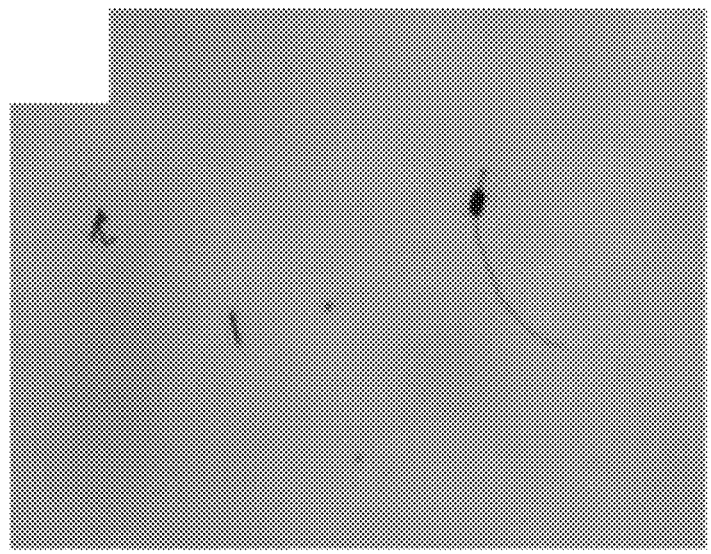
FIGS. 13A-13B are optical images showing the trajectory of silicon nanowires (13A) and of $TiO_2$ nanowire shell (13B) together with asymmetric nanotrees in 0.1% $H_2O_2$ aqueous solution.
Figure 13B:
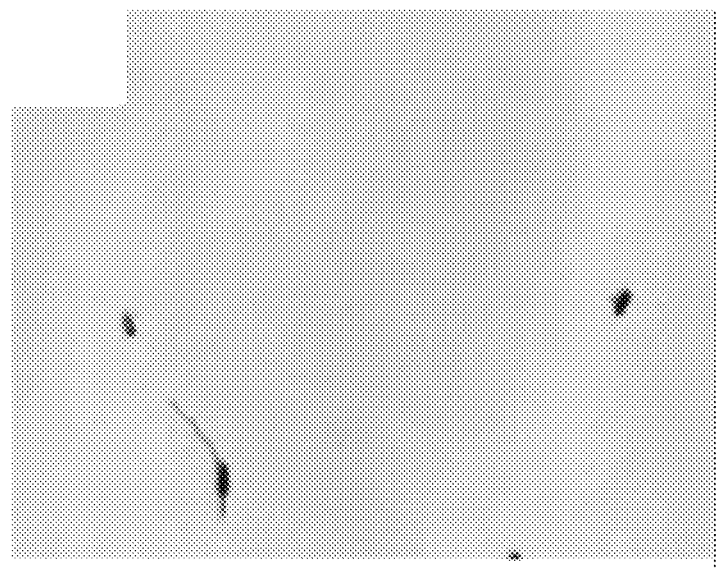
Figure 13C:
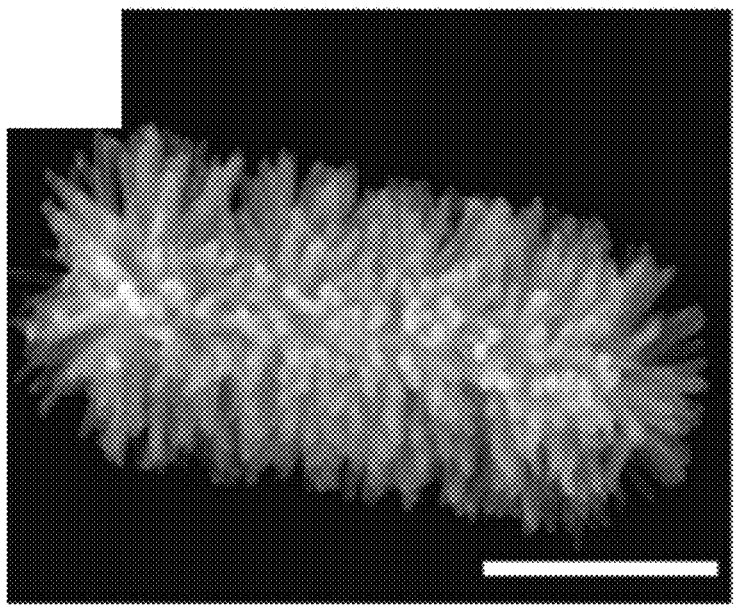
FIG. 13C is an SEM image of $TiO_2$ nanowire shell after the removal of silicon skeleton in $XeF_2$.

One or more embodiments of the nanomotors (e.g., Janus nanotrees and silicon nanowires) provided herein can be observed collectively in a sample holder such as, for example, glass slide, which can be maneuvered on a tri-axial micropositioning stage equipped with illumination sources (FIGS. 11A-11B). In some embodiments, the stage can be adjusted with a joystick to control the position of each nanomotor.

Figure 4:
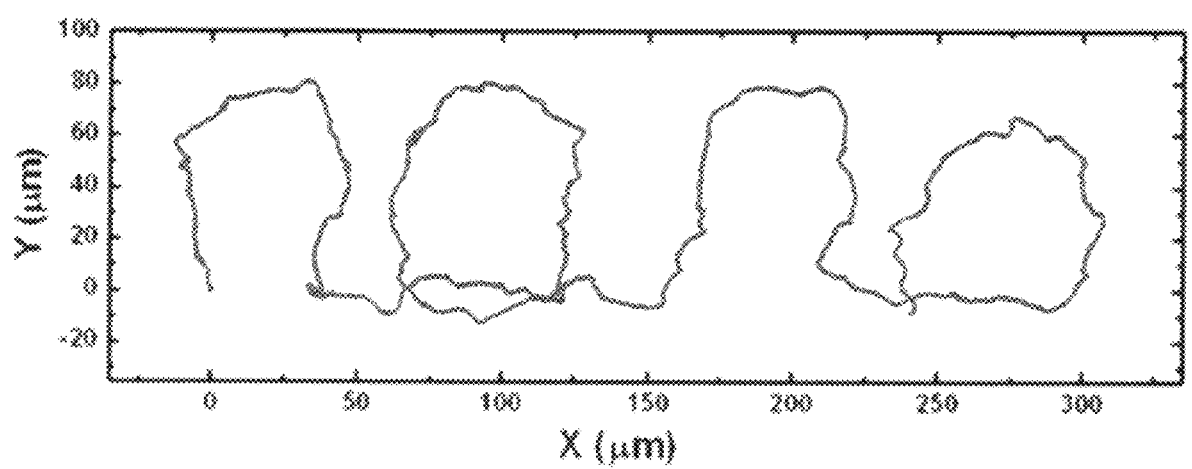
FIG. 4 shows the trajectory of a Janus nanotree according to an embodiment of the subject invention approximating the word "nano" (i.e., the overlay image) as directed by an adjustable light driver.

By changing the direction of incident light, embodiments of nanomotors provided herein can be substantially or at least partially "steered" along a desired trajectory, as demonstrated by FIG. 4 in which a trajectory spelling the word "nano" is traced.

Figure 14B:
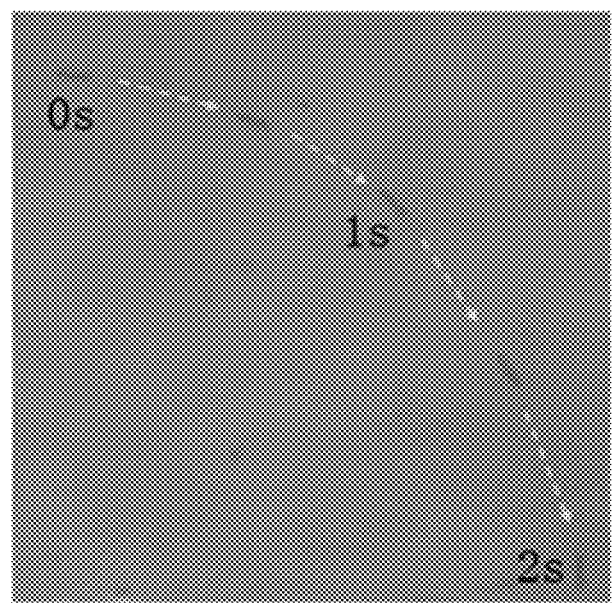
FIG. 14B is an optical image showing an individual Janus p/n wire migrating under visible light with a speed of about 80 μm/s.
Figure 16A:
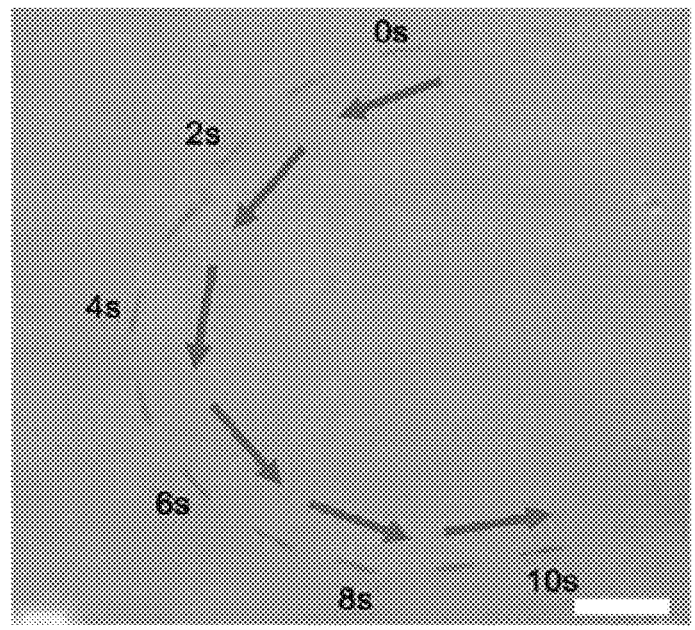
FIGS. 16A-16D show the migration behavior of a nanomotor according to an embodiment of the subject invention under visible light illumination.
Figure 16B:
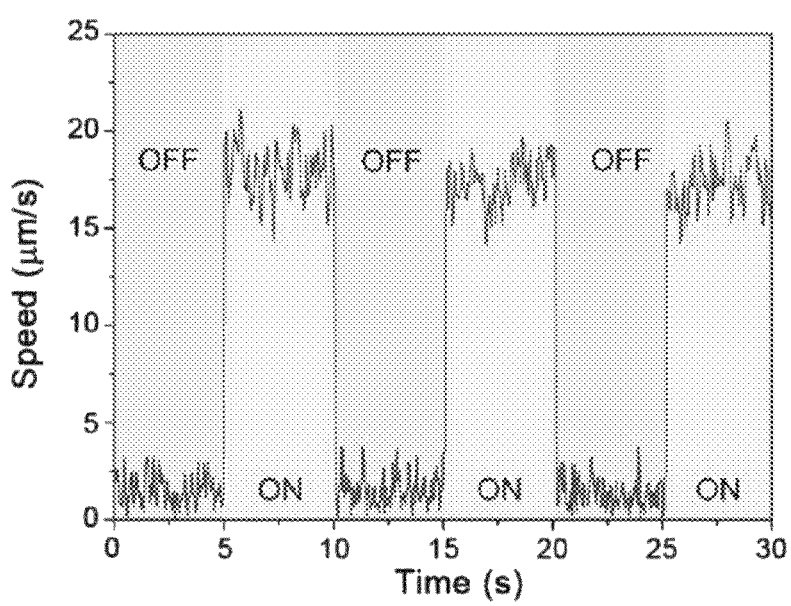

In a particular embodiment, the structure of a silicon nanowire-based motor with p-n junction can dramatically change the motor's migration trajectory (FIG. 14). The as-prepared p-n junctions motor displays an instantaneous and repeatable "ON-OFF" response by switching visible light illumination (FIG. 16B).

Figure 17A:
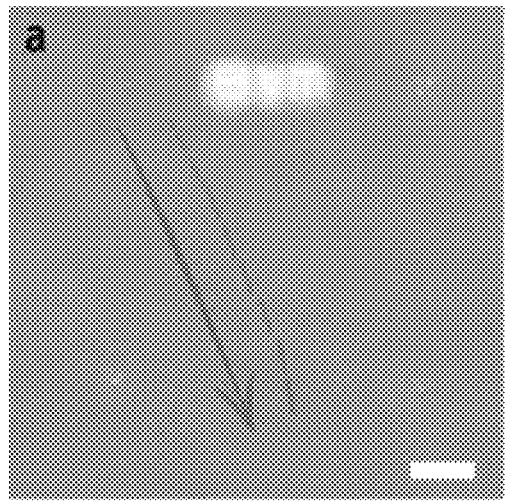
FIGS. 17A-17I illustrate different motion trajectories induced by end morphology.
Figure 17B:
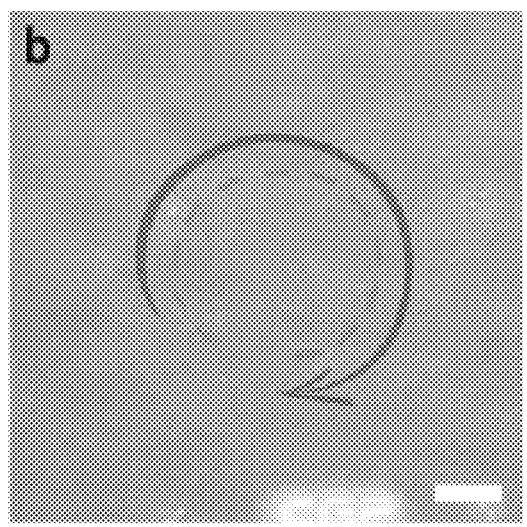
Figure 17C:
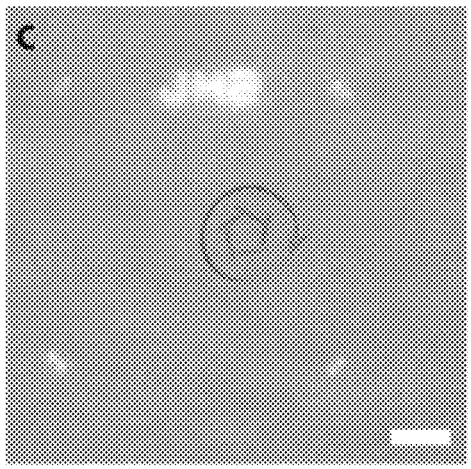
Figure 17D:
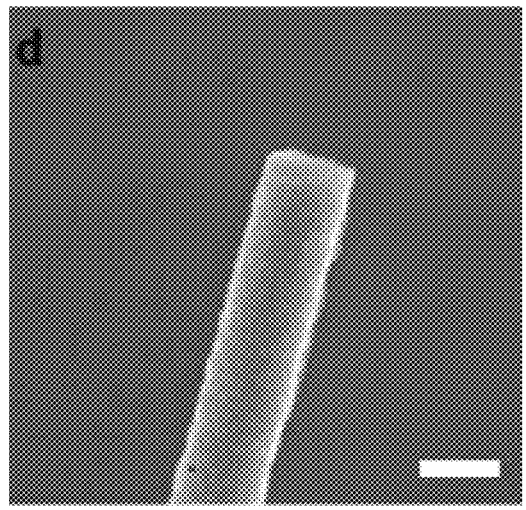
Figure 17E:
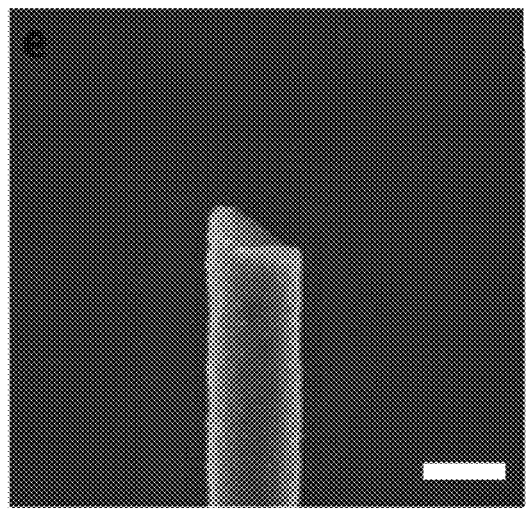
Figure 17F:
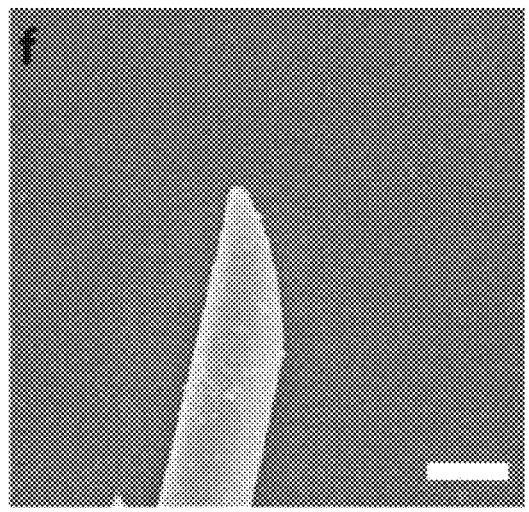

In some embodiments, several motion trajectories are exemplified by the p-n junction nanowires (FIGS. 17A-17C). After systematic SEM inspection, it was found that the shape of the end-fractured surface plays a significant role in steering the direction of the motor and determining the behavior of the motion (FIGS. 17D-17F). Numerical simulation results of nanowires with dimensions analogous to their corresponding SEM images accentuate the function of the p-type Si end surface. The results show that the asymmetric charge distribution in solution is formed by the highly confined photogenerated $H^+$ around the p-type surface due to spatially-defined reaction site of the fractured surface. As a result, the coupling of the symmetric/asymmetric charge surrounding the motor and the electric field raised by charge on the motor surface will exert an electrical force on the silicon nanowire.

Figure 17G:
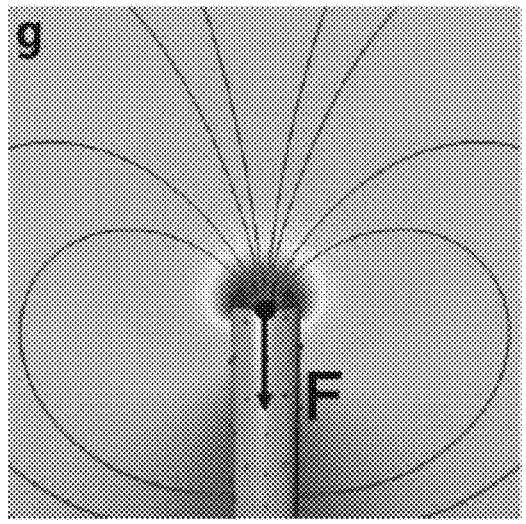
Figure 17H:
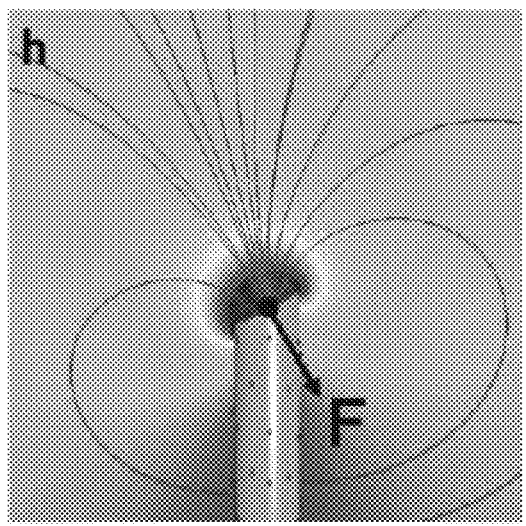
Figure 17I:
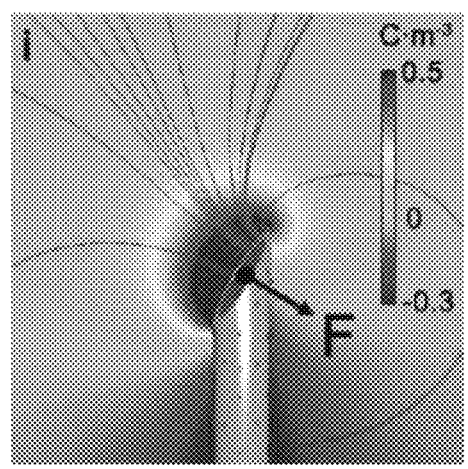

For motor with an asymmetric end surface, the force deviating from the long axis of the wire provides a force component perpendicular to the axis, resulting in a torque that propels the rotational motion of the motor (as shown in FIGS. 17G-17I). Furthermore, according to the simulation results and experimental observation, the effective functional scale of the chemical reaction and ions diffusion can be confined to hundreds of nanometers scale and the mechanical response is instant, which provides a potential strategy for the design of direction-controllable nanoscale machines.

As it is commonly known, the tolerance of biological cells to UV or even high intensity visible light is low, rendering the use of such light incompatible with many in-vivo applications. Advantageously, embodiments of the nanomotors provided herein can mobilize up to 5.8 μm/s under a visible light with intensity as low as 4.3 mW/cm². Furthermore, in some embodiments, the speed of the motion can be facilely tuned by varying the light intensity.

Photocurrent density (J) in a PEC reaction is proportional to incident light intensity (I). Therefore, an electrophoretic field can be estimated by Ohm's law (E=J/k), where k is the electrical conductivity of the particular coupling fluid. By substituting E in Hückel's Rule, it is expected that the migration velocity ($v_e$) of embodiments of nanomotors provided herein scales linearly to light intensity and zeta potential ($\zeta$), which is substantially in accordance with the following relation:

$$v_e = \frac{\varphi I \varepsilon \zeta}{\eta k} \quad [4]$$

where $\eta$ is the viscosity coefficient of a particular media and $\varphi$ is the external quantum efficiency (Harris, L. B. "Simplified calculation of electrophoretic mobility of non-spherical particles when the electrical double layer is very extended" J. Colloid Interface Sci. 34, 322-325 (1970)).

In some embodiments, the migration speed of nanomotors provided herein can be influenced by at least one of the following parameters: intensity of the incident light, wavelength of the incident light, magnitude of light absorption by the nanomotors, and ionic strength of the coupling fluid.

In some embodiments, the alignment of the light-driven nanomotors provided herein with respect to a light source can be at least partially determined by the polarity of the surface charge of at least one component of the nanomotor, i.e., the head and/or the tail of the nanomotor.

Advantageously, the directional light alignment enabled by technology provided herein is more desirable than magnetic alignment, which cannot distinguish field polarity and can result in alignment in a direction opposite to that which is desired. Further, the ability to directionally align a nanomotor enables the use of multiple beams to independently stimulate multiple embodiments of nanomotors located in close proximity to each other.

In further embodiments, nanomotors provided herein can be chemically treated in order to alter the polarity of the surface potential of one or more components of the nanomotors (e.g., the branches and/or trunk of a Janus nanotree; the p-type Si head and/or n⁺/p-type Si tail of a core-shell silicon nanowire), which can in turn affect the phototactic behavior of said nanomotors. In an embodiment as shown in FIGS. 6A-6D, superimposed images of sequential frames illustrate the migration of four different Janus nanotrees under UV illumination, each nanotree having been subjected to a different surface chemical treatment (or the lack thereof, as in the case of a pristine surface). Each arrow indicates the direction of migration. It is important to note that the direction of phototaxis (i.e., positive or negative) is a function of the surface treatment applied to a given nanotree. Here, four types of surface treatments, platinum, 3-[2-(2-aminoethylamino)-ethylamino]-propyltrimethoxysilane (AEEA), and 2-(4-Chlorosulfonylphenyl)ethyltrimethoxysilane (CSPTMS), and a pristine surface (i.e., without any treatment) are considered. Various types of chemical treatment modifications are possible and the claimed subject matter is not intended to be limited in scope to the particular modifications provided herein.

In some embodiments, the migration direction of a Janus nanotree provided herein is related to the polarity of its overall surface potential and the polarity of the surface potential of the head of the nanotree. In a preferred embodiment, a simple XNOR logic gate can be used to determine the nature of phototaxis (i.e., positive or negative) based on the polarity of the overall and of the head of the nanotree using the following relationship: phototaxis=$\zeta_{TiO_2} \oplus \zeta_{overall}$. Specifically, if the polarity of the overall zeta potential of the nanotree is the same as that of its head (i.e., both positive or both negative), then the nanotree exhibits positive phototactic behavior. In contrast, if the polarity of the overall zeta potential of the nanotree is opposite to that of the head, then the nanotree exhibits negative phototactic behavior. By designating positive zeta potential as "+" and negative as "−", phototactic behavior of Janus nanotrees with different surface chemical treatments can be described in Table I below.

TABLE I

Notations "+" and "−" refer to positive and negative surface potential, respectively.

| surface modification | surface potential | | | expected phototaxis |
| --- | --- | --- | --- | --- |
| | Silicon | TiO₂ | overall | |
| Pristine | − | + | + | positive |
| CSPTMS | − | + | − | negative |
| AEEA | + | + | + | positive |
| Platinum | − | − | − | positive |

Advantageously, the phototactic behavior of a given Janus nanotree can be readily adjusted and programmed by independently modifying the surface charge of one or more components of the nanotree by employing different chemical modifications.

Figure 7:
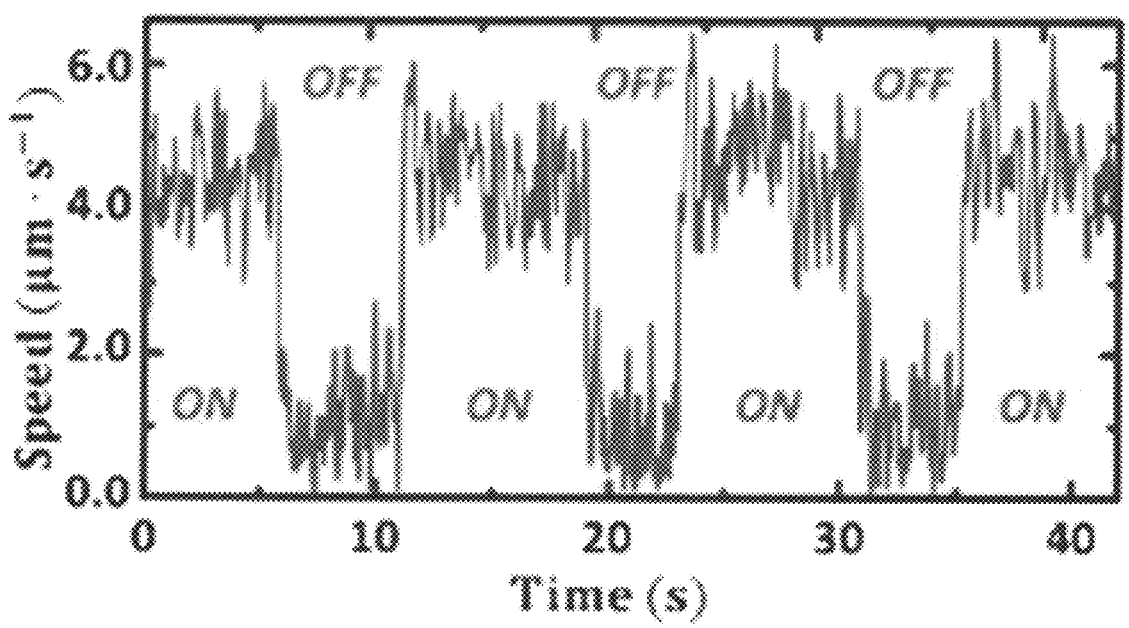
FIG. 7 is a plot of migration speed as a function of time of a Janus nanotree according to an embodiment of the subject invention.

For illustration purposes, FIG. 7 shows the migration speed of a Janus nanotree according to an embodiment of the subject invention with a pristine surface under chopped light exposure, suggesting that a charged Janus nanotree can generate autonomous motion via electrophoresis with a self-generated electric field. As shown in FIG. 6A, the pristine nanotree migrates in a tail-forward direction, implying a positive zeta potential. This is consistent with the fact that the surface area of the positively charged TiO₂ head is greater than that of the negatively charged silicon tail, leading to an overall positive charge of the nanotree.

Figure 9A:
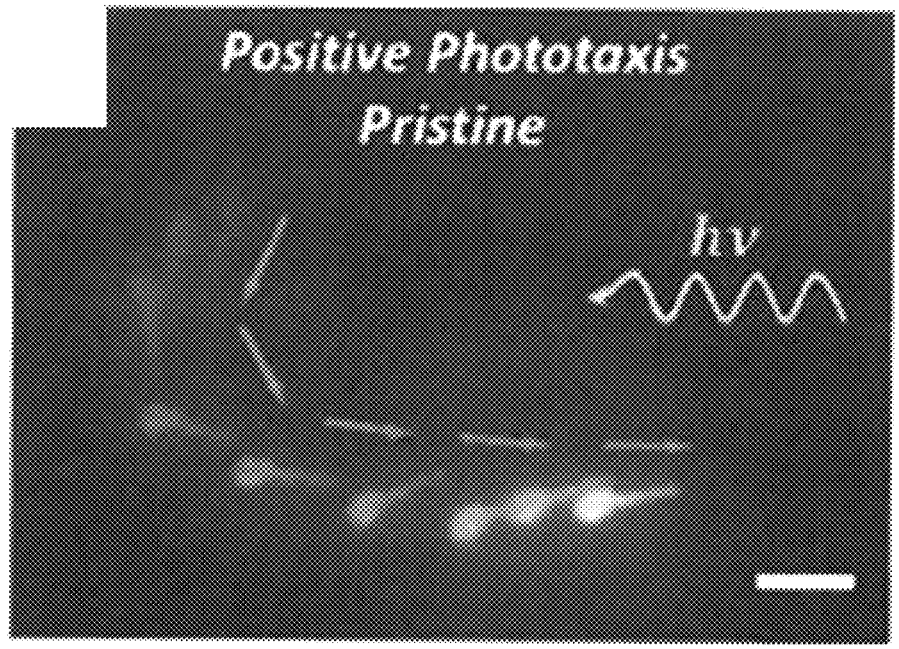
FIGS. 9A-9D are optical images showing the phototactic behavior of various Janus nanotrees according to embodiments of the subject invention with a pristine surface (9A) and with different surface treatments: AEEA (9B), CSPTMS (9C), and platinum (9D).
Figure 9B:
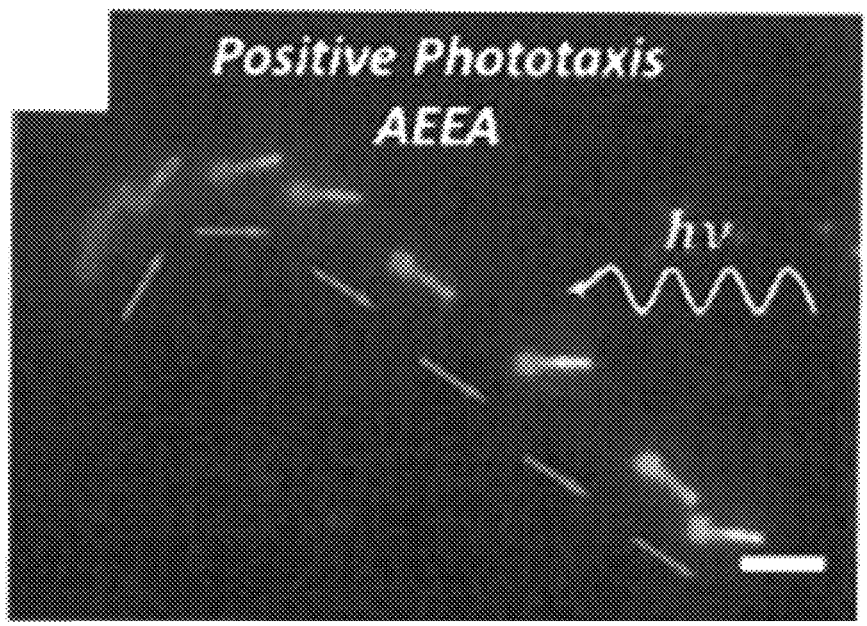
Figure 9C:
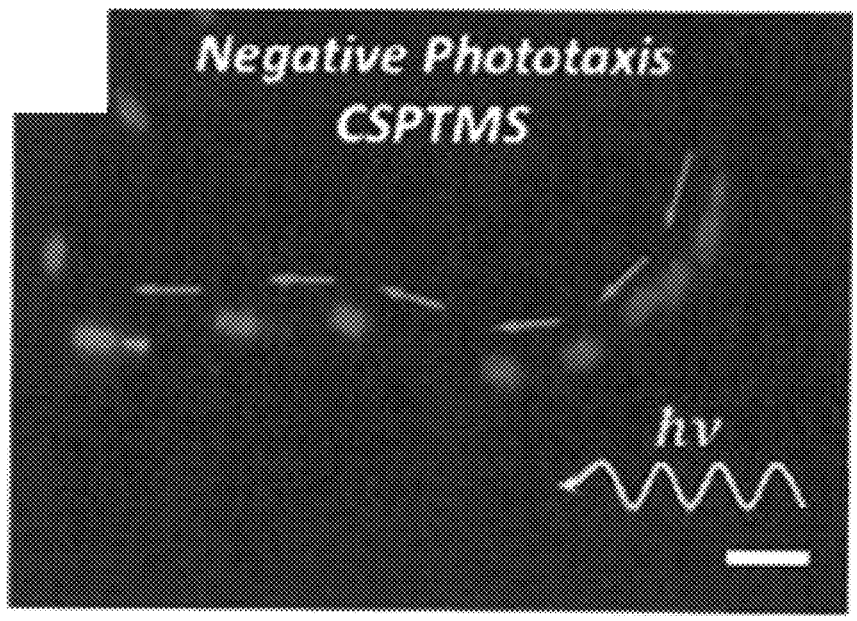
Figure 9D:
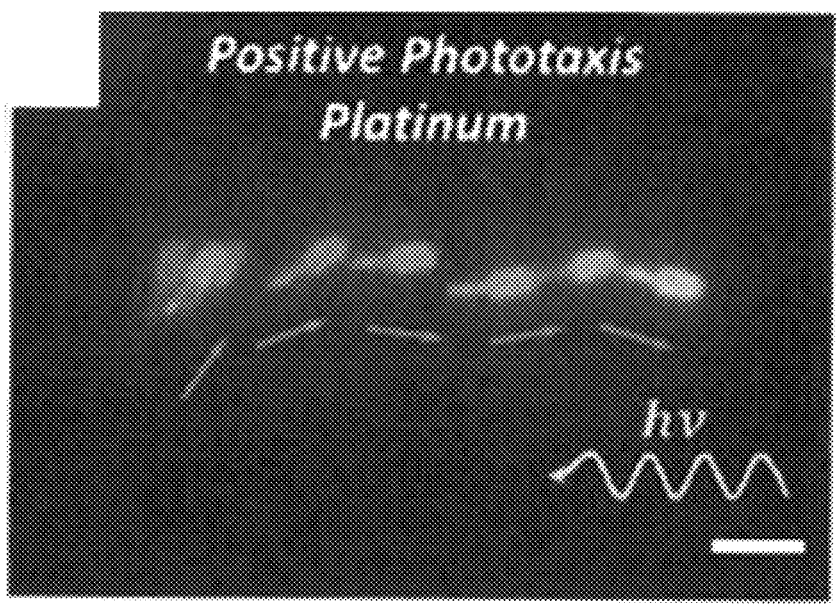

Furthermore, FIGS. 9A-9B are superimposed images of sequential frames that demonstrate both a pristine and an AEEA-treated Janus nanotree migrating in a tail-forward direction, equivalent to the behavior of positive phototaxis (i.e., migration towards a light source). In contrast, for a CSPTMS-treated nanotree, the charge polarity is dominated by a negatively charged silicon tail with benzenesulfonic acid grafted thereto, leading to a head-forward direction of migration with negative phototaxis (FIG. 9C). FIG. 9D is a superimposed image of sequential frames that indicates a Janus nanotree with negatively charged platinum nanoparticles attached to the silicon tail moving with positive phototaxis.

Compared with a substantially one-dimensional linear nanomotor, a three-dimensional nanomotor with biphasic geometry can generate an asymmetric electric field away from its body axis in response to light stimulation, producing phototaxis. Likewise, in some embodiments, extended branches on a nanotree can generate a PEC reaction product concentration gradient substantially perpendicular to the body axis of the nanotree, so that the nanotree can be substantially or at least partially steered by a directed light source.

Of course, many three-dimensional geometries in addition to the Janus nanotree provided herein are possible depending upon the applications of the nanomotors and the claimed subject matter is not intended to be limited in scope to a particular geometry. It is also noted that for similar geometries, improvement in performance is also possible by adjusting the radius of the branches and/or lengths of the trunk of a Janus nanotree.

In further embodiments and according to the Smoluchowski relation, the migration speed of nanomotors (e.g., nanotrees and nanowires) is expected to be proportional to their surface potential. As a result, different parameters can be used to compare performance in various nanomotors including, for example, length of nanomotor, ratio of the length of bare silicon trunk to the length of nanomotor, and maximum speed of nanomotor at the highest power output. Table II below, for example, compares the light intensity normalized migration velocity (LINMV) of an AEEA-modified nanotree to a pristine nanotree with similar geometry. As expected, higher zeta potential appears to result in higher migration speed.

TABLE II

Fitting slope and its standard deviation calculated in the adjusted linear regression method.

| | pristine vs AEEA | slope ($mm^3/J$) | Slope error ($mm^3/J$) | length (μm) | silicon ratio | maximum speed (μm/s) |
|---|---|---|---|---|---|---|
| a | pristine | 0.5177 | 0.03328 | 8.57 | 0.6975 | 3.78 |
|   | AEEA     | 0.8272 | 0.02693 | 10.80 | 0.7218 | 4.83 |
| b | pristine | 0.5625 | 0.01867 | 10.99 | 0.6494 | 4.62 |
|   | AEEA     | 0.6322 | 0.03538 | 9.86 | 0.6410 | 4.2 |
| c | pristine | 0.3352 | 0.02102 | 12.40 | 0.6210 | 2.94 |
|   | AEEA     | 0.4136 | 0.03199 | 8.28 | 0.6195 | 2.94 |
| d | pristine | 0.4356 | 0.02578 | 9.37 | 0.5869 | 2.73 |
|   | AEEA     | 0.4509 | 0.02921 | 9.64 | 0.5769 | 2.94 |
| e | pristine | 0.5155 | 0.03386 | 7.57 | 0.5851 | 4.20 |
|   | AEEA     | 0.5155 | 0.03302 | 9.98 | 0.5848 | 4.41 |
| f | pristine | 0.2596 | 0.02950 | 11.43 | 0.5871 | 2.52 |
|   | AEEA     | 0.2957 | 0.04009 | 10.14 | 0.5578 | 2.52 |

In some embodiments, other photoactive materials including, but not limited to, narrow-bandgap semiconductors, photoactive polymers, and proteins can be used to fabricate nanomotors as alternatives for silicon nanowires.

Materials and Methods

A microscope light with a 450 nm longpass filter was used as the visible light source and 0.5 wt. % $H_2O_2$ in aqueous solution iwass used as both the electrons and holes scavenger due to its fast reaction kinetics.

Without illumination (<2 mW/cm$^2$), the photochemical reaction was switched "OFF", $H_2O_2$ decomposition reaction on the motor was thus negligible and the motor only showed Brownian motion. Upon illumination, the photochemical reaction was switched "ON" and the motor began to move as shown in FIG. 16A. The superimposed image of sequential frames represents the 0-10 s motor motion with a speed of ~19.8 μm/s under the light intensity of 176.2 mW/cm$^2$.

The experimental setup for migration study used a testing stage with five 365 nm LED beads. One XYZ micropositioning stage was mounted beside an LED stage and fixed to a glass slide sample holder. Five 3 W 365 nm LED beads (LG Innotek) were attached to a 3D printed black hollow cubic box. A joystick was used to independently adjust LED direction. One XYZ micropositioning stage was mounted on an aluminum plate as a sample holder to finely adjust the sample position relative to the generated LED light. A customized liquid sample holder made of two glass slides was clamped on a micropositioning stage and placed under an optical microscope (Olympus MX51M).

EXAMPLES

Following are examples that illustrate procedures for practicing the invention. These examples should not be construed as limiting. All percentages are by weight and all solvent mixture proportions are by volume unless otherwise noted.

Example 1—Designing and Fabricating a Silicon Nanowire Motor

In an embodiment, the nanomotor is configured as a silicon nanowire having Pt nanoparticle catalyst deposited on the surface thereof. The feature of this design is to make a confined reaction area, which is a p-type fractured surface exposed at one end of the nanowire. The silicon wire array was fabricated by standard photolithography and metal-assisted electroless chemical etching. The n$^+$-Si shell was produced by a thermal diffusion method. Typically, a Si handle wafer with spin-coated P450 Phosphorus dopant (Filmtronics, Inc) was used as the phosphorous source. The Si nanowire array sample was annealed at 900° C. under rough vacuum with 55 sccm $H_2$/Ar gas (1:10, v/v) for 3 min at about 400 μm beneath the handle wafer. After BHF treatment, Pt nanoparticles having an average diameter of 2 nm were loaded on the surface of silicon nanowires by magnetron sputtering. Before motion measurements, the Pt nanoparticles need to be activated by 0.5 mM chloroplatinic acid ($H_2PtCl_6$) (Sigma-Aldrich) and 0.5 M HF Solution.

Example 2—Measuring Migration of the Nanomotors

The as-prepared nanowire motors can be scraped off from the silicon wafer and transferred into $H_2O_2$ solution for motion measurement. The motor's motion was observed and recorded using an Olympus MX51 optical microscope and Canon camera. The supercontinuum laser was used as the light source for the wavelength-dependent measurement ranging from 400 nm to 800 nm with an interval of 20 nm. After recording, the motor can be stopped by natural evaporation to dry off water. The microscope halogen lamp with a 450 nm cut-off filter was used as the light source for the "ON-OFF", light intensity and ionic strength-dependent measurements.

Example 3—Measuring PEC Photocurrent of the Nanomotors

A two-electrode photochemical measurement setup was built to determine the photocurrent of n$^+$-Si/p-Si electrodes in $H_2O_2$ solution (as shown in FIG. 16B). A piece of doped n$^+$-Si nanowire array wafer (1 cm×1 cm) loaded with platinum nanoparticles was used as the photoanode and another piece of p-Si nanowire array wafer (1 cm×1 cm) without Pt as the photocathode. The two separated electrodes were immersed in 0.5 wt. % $H_2O_2$ and 0.5 M $Na_2SO_4$ aqueous solution, and connected to a Keithley 2635B sourcemeter (Tektronix) under zero bias for the short-circuit current measurement. The photocurrent was recorded using a white LED light with power intensity of 35.0 mW/cm$^2$.

Example 4—Simulating Light Absorption of the Nanomotors

Absorption simulation was conducted using a commercial finite difference time domain (FDTD) software package (Lumerical FDTD Solutions software). The diameter of the motor was adopted from SEM measurement after recording its motion behavior. The simulation space was 5 µm×5 µm×5 µm with perfectly matched layer boundaries along the x-, y- and z-axes. The light source was a plane wave propagating along minus z direction with wavelength ranging from 400 nm to 800 nm. The mesh is a non-uniform type with accuracy of 3. The absorption spectra were calculated using a 2D cross section monitor.

Example 5—Designing and Fabricating a Janus Nanotree Motor

The fabrication process of a Janus nanotree according to an embodiment of the subject invention is illustrated in FIG. 2. Pt nanoparticles were loaded on the surface of silicon nanowires by immersing in a solution of 0.5 mM chloroplatinic acid ($H_2PtCl_6$) (Sigma-Aldrich) and 0.5M HF for 1.5 min. The Pt loading process can be repeated up to 5 times. The Pt-embedded was then annealed at 600° C. in vacuum with 500 sccm Ar flow for 30 min to form platinum silicide.

The Pt-embedded silicon nanowires and an associated substrate was drop-cast with 2 wt % poly(methyl methacrylate) (PMMA) in anisole. After slow evaporation of anisole in a sealed box, filled PMMA was removed by oxygen plasma to expose silicon nanowires of a desired length. After dipping in diluted HF to remove the native oxide, the silicon nanowire was loaded into an atomic layer deposition (ALD) chamber (Savannah 200, Cambridge Nanotech Inc).

A 5 nm $TiO_2$ seed layer was coated on the exposed surface of the silicon nanowire using tetrakis(dimethylamino)titanium (TDMAT) as a precursor. The nanowire was then annealed at 450° C. in ambient air for 30 min to remove residual PMMA and to crystallize an amorphous $TiO_2$ layer.

10 mL of DI water, 10 mL of 37% HCl and 0.28 mL of titanium isopropoxide (J&K Chemical) was mixed to form a $TiO_2$ nanowires growth solution. The solution was shaken for 15 min and transferred into a Teflon liner together with the silicon nanowire to a stainless autoclave. Growth of the $TiO_2$ nanowire took place in a convection oven at 200° C. for 90 min.

Example 6—Measuring PEC Photocurrent of the Nanotrees

A diagram of a PEC photocurrent measurement setup comprising a separated $TiO_2$ photoanode and a silicon photocathode is shown in FIGS. 5A-5B. The setup was used to measure photocurrent for Si/$TiO_2$ electrodes in $H_2O_2$ solution. A silicon wafer comprising an array of nanowires was loaded with platinum nanoparticles was used as a 1 cm×2 cm photocathode, as shown in FIG. 5B. Likewise, $TiO_2$ nanowires were grown on fluorine doped tin oxide (FTO) glass under similar conditions to form a 1 cm×2 cm photoanode, shown in FIG. 5A.

Two separated electrodes were immersed in 1% $H_2O_2$ and 0.5 M $Na_2SO_4$ aqueous solution, and connected to a PXI-4132 precision source measure unit (National Instrument) under zero bias for short-circuit current measurement. A ~0.1 mA/cm$^2$ photocurrent was recorded under a 100W Xenon lamp illumination, shown in FIG. 5C, confirming photocurrent generation for a Janus nanotree according to an embodiment of the subject invention. A 100W Xe lamp was used as the light source.

Example 7—Measuring Migration Speed of the Nanotrees

A customized Matlab program was used here for migration speed analysis. First, videos taken of embodiments were decomposed into individual gray scale image frames. Then, the centroid of an individual frame was calculated and used as the position of the embodiment in the frame. The particular trajectory was therefore obtained sequentially. Coordinates were smoothed by averaging three consecutive frames. Speed was calculated from a smoothed trajectory.

Figure 8:
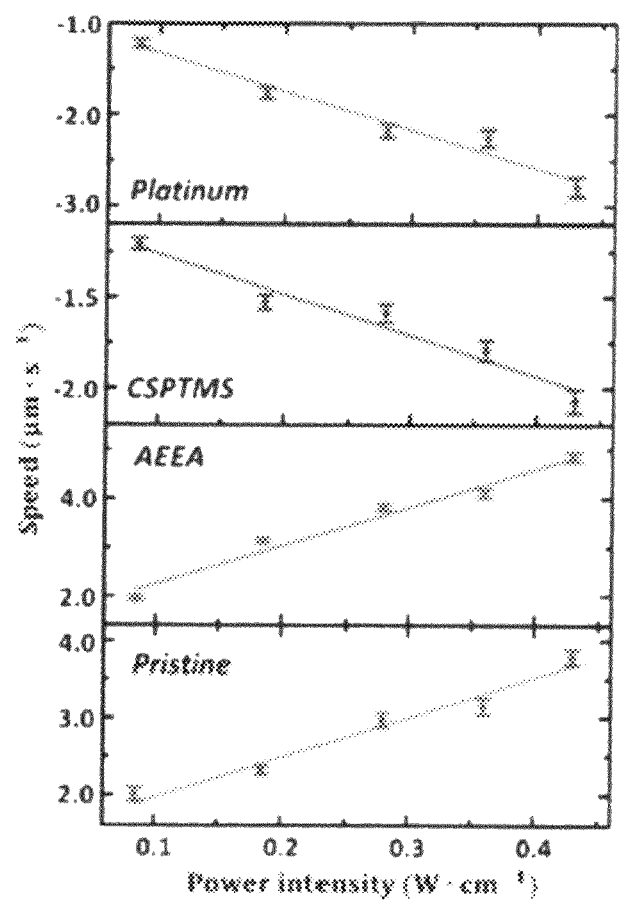
FIG. 8 shows plots of the speed of propulsion of various Janus nanotrees according to embodiments of the subject invention whose surfaces have been treated with different chemicals.

To obtain some precision in migration speed, over 100 speed points were used to calculate average speed ($\bar{v}$) and a standard deviation ($\sigma\_v$). A confidence limit v= $\bar{v}\pm(z\sigma\_v)/\sqrt{N}$, where z was 1.96 (95% confidence limit), was used with N, the number of speed points. A small silicon photodiode was calibrated by comparing optical power meter measurements (POWER MAX 500D, Molectron), such as against UV light intensity from an LED. Calculated LINMV were reported below at a 95% confidence level. FIG. 8 shows plots illustrating that speed scaled linearly with light intensity.

Example 8—Chemically Treating the Nanotrees

Two modifications employing negatively charged molecules were: (1) benzenesulfonic acid grafted on a Si surface by CSPTMS treatment (LINMV=−0.22±0.03 mm$^3$J$^{−1}$), and (2) platinum nanoparticles (ζ≈−40 mV, LINMV=− 0.43±0.05 mm$^3$J$^{−1}$) attached to the Si surface by thermal decomposition of drop-cast chloroplatinic acid. Both methods yielded head-forward migration, shown by FIGS. 6C and 6D, and presented as negative speed in FIG. 8.

As an example, the following method was used to implement surface treatment involving AEEA. After reloading with platinum nanoparticles by electroless deposition, a nanotree was immersed in 10 wt % AEEA (Sigma Aldrich) and absolute ethanol for 15 h at 50° C. The nanotree was washed thoroughly with ethanol and DI water, respectively.

As another example involving CSPTMS, a nanotree was etched in 2.5 M HF and 2.5 mM $AgNO_3$ for 5 min to roughen the surface of its silicon tail. After silver removal in 65 wt % nitric acid for 10 min, the nanotree was reloaded with fresh Pt nanoparticles and immersed in 10 wt % CSPTMS (Acros Organics) in ethanol at 35° C. for 15 h. The nanotree was then rinsed thoroughly with ethanol and stored in DI water for 2 h.

As yet another example, Pt treatment required a 10 nm $TiO_2$ layer to be deposited on the surface of a nanotree by ALD to prevent or reduce silicide formation. Then, 200 µL of 0.1 mM $H_2PtCl_6$ aqueous solution was drop-cast on the nanotree and annealed at 600° C. for 5 min in vacuum with 500 sccm Ar flow to decompose $H_2PtCl_6$ into Pt nanoparticles at the surface of the nanotree.

Example 9—Comparing Migration Velocity of Nanotrees Treated with Various Chemicals As shown in FIG. 8, after treatment with AEEA, positively charged amines were grafted onto the surface of a nanotree, which led to a higher zeta potential. An AEEA-treated nanotree showed a LINMV of $(v\_e)\_((AEEA))= 0.83\pm0.05$ mm$^3$J$^{-1}$, which was higher than a pristine nanotree embodiment $((v\_e)\_((pristine))=0.52\pm0.07$ mm$^3$J$^{-1})$. Similarly, if negatively charged molecules were grafted for an embodiment, it is expected to lower overall zeta potential so that the nanotree may move more slowly or even reverse its direction.

Example 10—Mixing Nanotrees with Various Motor Components

Embodiments of the Janus nanotree provided herein were mixed with selected components thereof, such as silicon nanowires and/or $TiO_2$ nanowire branches, in 0.1% $H_2O_2$ aqueous solution, in order to observe if an effect on directional migration could result for the selected components.

Pt-loaded silicon nanowire components were mixed with embodiments of Janus nanotree and placed in 0.1% $H_2O_2$ solution. Using 365-nm illumination, no obvious directional migration was observed for the silicon nanowires components.

Likewise, embodiments of Janus nanotree were etched in a customized $XeF_2$ etcher to selectively remove silicon nanowire trunks. The remaining $TiO_2$ nanowire branches were cleaned by oxygen plasma to provide nanowire components and placed in 0.1% $H_2O_2$ solution together with the nanotrees. Under UV illumination, directional migration was not observed for components of the $TiO_2$ nanowire branches.

Example 11—Investigating Factors Influencing Migration Speed of the Nanomotors

Figure 16C:
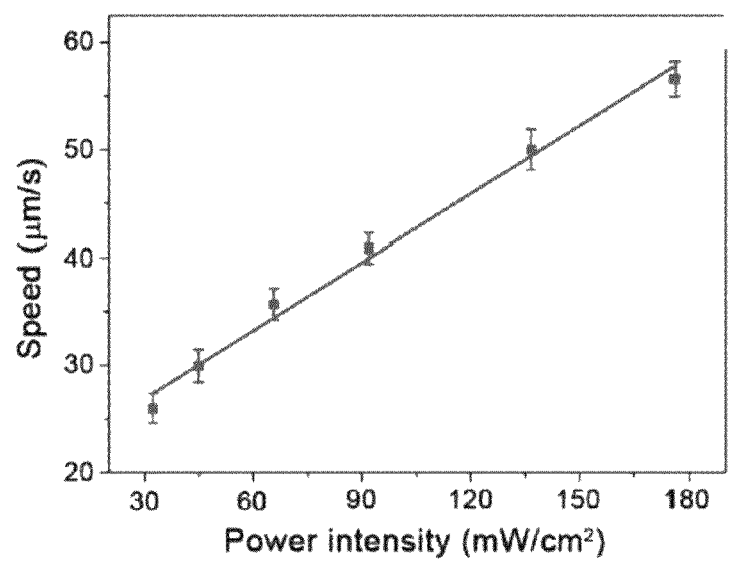

To investigate the relationship between migration speed and light intensity, the speed of the same motor was measured under different light intensity levels. The results showed that the motor speed scaled linearly with the light intensity and can be tuned from 25.6 μm/s to 56.6 μm/s by adjusting the light intensity from 32.2 mW/cm$^2$ to 176.2 mW/cm$^2$ (FIG. 16C).

To confirm the electrophoretic mechanism of motor migration, the correlation between ionic strength and migration speed was explored. Much effort have been taken to gain quantitative understanding of the mechanism and influence factors of the electrophoretic migration, including the following scaling equation that resembles the Helmholtz-Smoluchowski expression:

$$v_e \propto \frac{F\lambda_D^2}{\eta D_+}j + \zeta \propto \frac{\varepsilon\zeta}{\eta}\frac{RT}{FD_+ i}j_+ \quad [5]$$

where $\zeta$ is the reaction-driven proton flux, F is Faraday's constant, $\lambda_D$ is the Debye length, $j^+$ is the reaction-driven proton flux, $D_+$ is the diffusivity of protons, i is the ionic strength, R is the ideal gas constant, and T is the temperature. This equation predicts that the motor migration velocity $v_e$ should scale quadratically with the Debye length or inversely with the ionic strength.

Figure 16D:
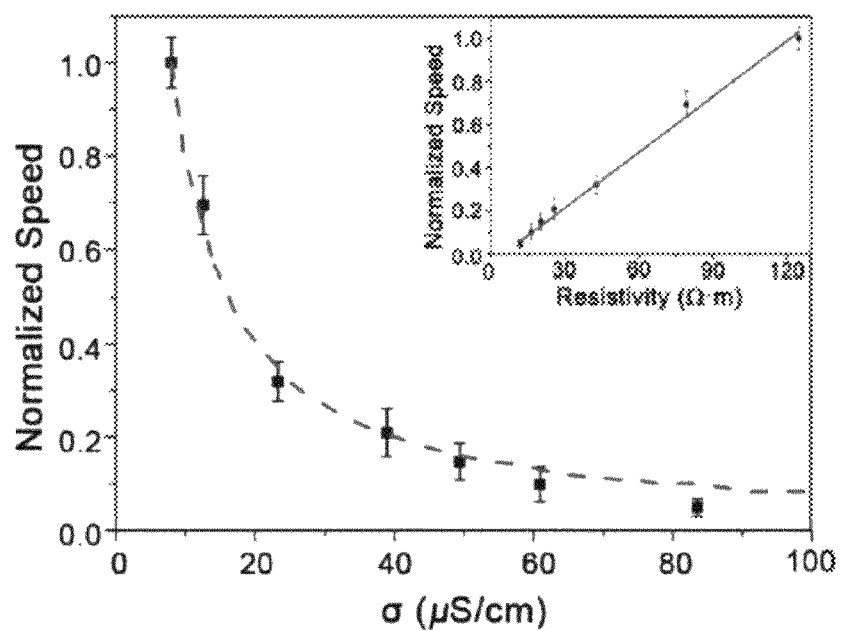

To study the influence of ionic strength on the speed of embodiments of nanomotors and to clarify the mechanism of migration, an in-situ ionic strength measurement system was designed to record the motion speed of a specific motor at different NaCl concentrations. Assuming that the viscosity, the dielectric constant, and the flux of the ions in the solution maintain the same level, the change of the solution conductivity with the different ionic strength exhibited a negative correlation with the motor velocity. FIG. 16D shows the dependence of normalized experimental motor speed on solution conductivity, which is consistent with the theoretical curve (red dash line). For clarity, the motion speed is plotted versus resistivity, scaling linearly with the resistivity of solution, which confirms self-electrophoresis propelled mechanism in the p-n junction silicon nanomotors.

The wavelength and size dependence of light absorption have been intensively studied for Si and Ge nanowires in solar cell and photodetectors. The reported external quantum efficiency (EQE) value can be well estimated by numerical simulation of light absorption, which provides a credible approach for the performance prediction and photon management. As depicted in the Si nanowire p-n junction nanomotor, the chemical reaction was triggered by photo-generated electron-hole pairs. Because the migration speed of motor is proportional to the light intensity (Equation 4), a positive correlation between light absorption and the migration velocity can be expected.

To investigate the wavelength dependence of the motor speed, the speed of the same individual motor was measured under wavelengths ranging from 500 nm to 800 nm in a 20-nm interval. The normalized speed curve was obtained after dividing the speed by the incident photon flux at the corresponding wavelength.

Figure 18A:
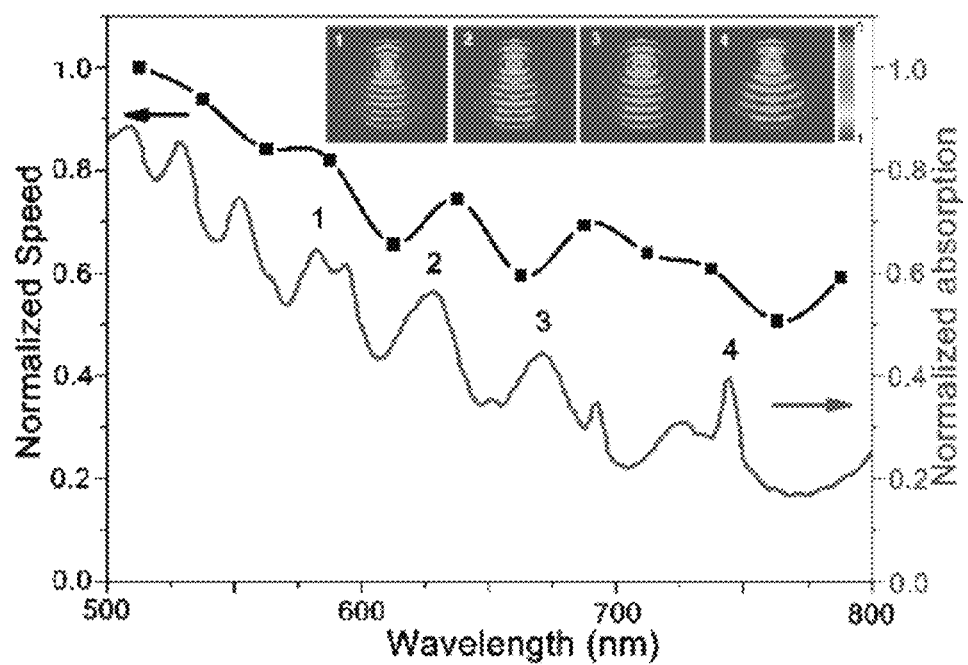
FIGS. 18A-18B illustrate the wavelength-dependent nature of the migration speed and light absorption of a nanomotor according to an embodiment of the subject invention.
Figure 18B:
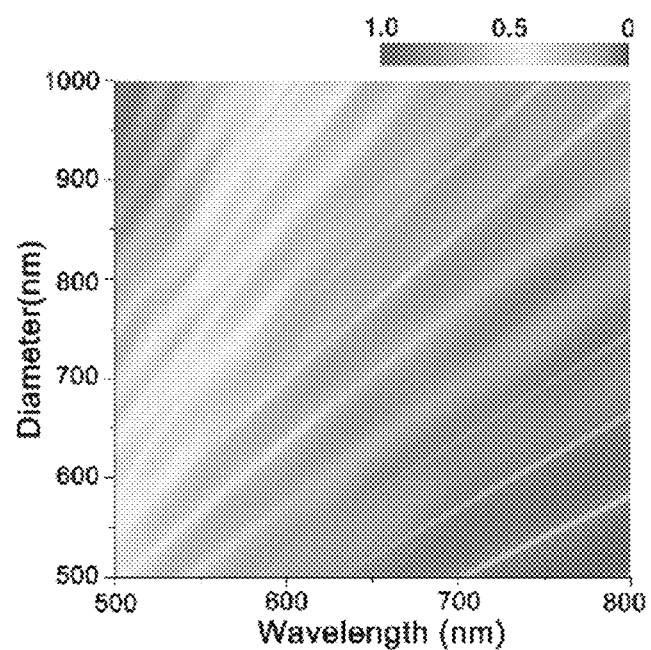

After the speed measurement, the motor was stopped on the glass holder and the diameter of the specific motor was characterized by SEM. Adopting the measured nanomotor dimensions, the FDTD simulated absorption peaks (FIG. 18A, red line) agreed well with the feature peaks of experimental speed curve (black line), echoing the fact that the mechanical motion of the nanomotor was intimately related to the absorption characteristics of the silicon wire. Additionally, the simulation showed different absorption modes at different absorption peaks. For instance, the peaks at 581 nm, 628 nm, 670 nm, and 745 nm correspond to Fabry-Perot type modes with different antinodes and standing waves in the absorption profile. To give an overview of the wavelength and diameter dependence of the Si wire light absorption, the absorption intensity was systematically explored by FDTD simulation (FIG. 18B), which provided a guidance for controlling the motion by engineering the morphology and light absorption of the nanomotor and shows potential approach for future precisely controllable devices.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

1. Wang J, Gao W. Nano/Microscale motors: biomedical opportunities and challenges. ACS Nano 6, 5745-5751 (2012).
2. Moo J G, Pumera M. Chemical energy powered nano/micro/macromotors and the environment. Chemistry 21, 58-72 (2015).

3. Patra D, Sengupta S, Duan W, Zhang H, Pavlick R, Sen A. Intelligent, self-powered, drug delivery systems. Nanoscale 5, 1273-1283 (2013).
4. Jurado-Sánchez B, Escarpa A. Milli, micro and nanomotors: Novel analytical tools for real-world applications. TrAC Trends in Analytical Chemistry, (2016).
5. Nain S, Sharma N N. Propulsion of an artificial nanoswimmer: a comprehensive review. Frontiers in Life Science 8, 2-17 (2014).
6. Wang W, Duan W, Ahmed S, Mallouk T E, Sen A. Small power: Autonomous nano- and micromotors propelled by self-generated gradients. Nano Today 8, 531-554 (2013).
7. Ibele M, Mallouk T E, Sen A. Schooling behavior of light-powered autonomous micromotors in water. Angew Chem Int Ed Engl 48, 3308-3312 (2009).
8. Walter F. Paxton, et al. Catalytic Nanomotors: Autonomous Movement of Striped Nanorods. J AM CHEM SOC 126, 13424-13431 (2004).
9. Jiang H R, Yoshinaga N, Sano M. Active motion of a Janus particle by self-thermophoresis in a defocused laser beam. Phys Rev Lett 105, 268302 (2010).
10. Gao W, et al. Cargo-towing fuel-free magnetic nanoswimmers for targeted drug delivery. Small 8, 460-467 (2012).
11. Li J, et al. Magneto-Acoustic Hybrid Nanomotor. Nano Lett 15, 4814-4821 (2015).
12. Solovev A A, Sanchez S, Pumera M, Mei Y F, Schmidt O G. Magnetic Control of Tubular Catalytic Microbots for the Transport, Assembly, and Delivery of Micro-objects. Adv Funct Mater 20, 2430-2435 (2010).
13. Dong R, Zhang Q, Gao W, Pei A, Ren B. Highly Efficient Light-Driven TiO2-Au Janus Micromotors. ACS Nano 10, 839-844 (2016).
14. Hong Y, Diaz M, Córdova-Figueroa U M, Sen A. Light-Driven Titanium-Dioxide-Based Reversible Microfireworks and Micromotor/Micropump Systems. Adv Funct Mater 20, 1568-1576 (2010).
15. Chaturvedi N, Hong Y, Sen A, Velegol D. Magnetic enhancement of phototaxing catalytic motors. Langmuir 26, 6308-6313 (2010).
16. Ibele M E, Lammert P E, Crespi V H, Sen A, Emergent, Collective Oscillations of Self-Mobile Particles and Patterned Surfaces under Redox Conditions. ACS Nano 4, 4845-4851 (2010).
17. Duan W, Ibele M, Liu R, Sen A. Motion analysis of light-powered autonomous silver chloride nanomotors. The European physical journal E, Soft matter 35, 77 (2012).
18. Duan W, Liu R, Sen A. Transition between collective behaviors of micromotors in response to different stimuli. J Am Chem Soc 135, 1280-1283 (2013).
19. Giudicatti S, et al. Photoactive rolled-up TiO microtubes: fabrication, characterization and applicationsdaggerElectronic supplementary information (ESI) available. See DOI: 10.1039/c4tc00796dClick here for additional data file. Journal of materials chemistry C, Materials for optical and electronic devices 2, 5892-5901 (2014).
20. Mou F, et al. Single-Component TiO2 Tubular Microengines with Motion Controlled by Light-Induced Bubbles. Small 11, 2564-2570 (2015).
21. Solovev A A, Smith E J, Bof' Bufon C C, Sanchez S, Schmidt O G. Light-controlled propulsion of catalytic microengines. Angew Chem Int Ed Engl 50, 10875-10878 (2011).
22. Cao, L, White, J S, Park, J-S, Schuller, J A, Clemens, B M, Brongersma M L. Engineering light absorption in semiconductor nanowire decives. NATUREMATERIALS 8, 643-647 (2009).
23. Cao, L, et al. Semiconductor nanowire optical antenna solar absorbers. Nano Lett 10, 439-445 (2010).
24. Garnett E, Yang P. Light trapping in silicon nanowire solar cells. Nano Lett 10, 1082-1087 (2010).
25. Kelzenberg M D, et al. Enhanced absorption and carrier collection in Si wire arrays for photovoltaic applications. NATUREMATERIALS 9, 239-244 (2010).
26. Brittman S, Gao H, Garnett E C, Yang P. Absorption of light in a single-nanowire silicon solar cell decorated with an octahedral silver nanocrystal. Nano Lett 11, 5189-5195 (2011).
27. Kim S-K, et al. Tuning Light Absorption in Core/Shell Silicon Nanowire Photovoltaic Devices through Morphological Design. Nano Letters 12, 4971-4976 (2012).
28. Shyue J, Guire M R D. Acid-Base Properties and Zeta Potentials of Self-Assembled Monolayers Obtained via in Situ Transformations. Langmuir 20, 8693-8698 (2004).
29. Wu Z, Lin X, Yingjie Wu, Si T, Sun J, Q H, Near-Infrared Light-Triggered "On/Off" Motion of Polymer Multilayer Rockets. ACS Nano 8, 6097-6105 (2014).
30. Liu Z, Li J, Wang J, Huang G, Liu R, Mei Y. Small-scale heat detection using catalytic microengines irradiated by laser. Nanoscale 5, 1345-1352 (2013).
31. Fujimoto H, Oku Y, Ogihara T, Takuda H. Hydrodynamics and boiling phenomena of water droplets impinging on hot solid. International Journal of Multiphase Flow 36, 620-642 (2010).
32. Xu T, et al. Ultrasound-modulated bubble propulsion of chemically powered microengines. J Am Chem Soc 136, 8552-8555 (2014).
33. Xuan M, Wu Z, Shao J, Dai L, Si T, He Q. Near Infrared Light-Powered Janus Mesoporous Silica Nanoparticle Motors. J Am Chem Soc 138, 6492-6497 (2016).
34. Harris L B. Simplified calculation of electrophoretic mobility of non-spherical particles when the electrical double layer is very extended. Journal of Colloid and Interface Science 34, 322-325 (1970).
35. Moran J L, Posner J D. Role of solution conductivity in reaction induced charge auto-electrophoresis. Physics of Fluids 26, 042001 (2014).
36. Paxton W F, Sen A, Mallouk T E. Motility of catalytic nanoparticles through self-generated forces. Chem Eur J 11, 6462-6470 (2005).
37. Nultsch, W. Phototaxis and photokinesis. Primitive Sensory and Communication Systems 29, 90 (1975).
38. Jekely, G. et al. Mechanism of phototaxis in marine zooplankton. Nature 456, 395-399 (2008).
39. Jékely, G. Evolution of phototaxis. Vol. 364 (2009).
40. Wakabayashi, Misawa, Y., Mochiji, S. & Kamiya, R. Reduction-oxidation poise regulates the sign of phototaxis in *Chlamydomonas reinhardtii*. Proceedings of the National Academy of Sciences 108, 11280-11284 (2011).
41. Wu, J. et al. Motion-based DNA detection using catalytic nanomotors. Nat Commun 1, 36 (2010).
42. Wang, J. Can Man-Made Nanomachines Compete with Nature Biomotors? ACS Nano 3, 4-9 (2009).
43. Balasubramanian, S. et al. Micromachine-Enabled Capture and Isolation of Cancer Cells in Complex Media. Angew. Chem. Int. Ed. 50, 4161-4164 (2011).
44. Li, J. et al. Nanomotor lithography. Nat Commun 5 (2014).
45. Hong, Y., Blackman, N. M. K., Kopp, N. D., Sen, A. & Velegol, D. Chemotaxis of Nonbiological Colloidal Rods. Phys. Rev. Lett. 99, 178103 (2007).
46. Paxton, W. F. et al. Catalytically Induced Electrokinetics for Motors and Micropumps. J. Am. Chem. Soc. 128, 14881-14888 (2006).
47. Laocharoensuk, R., Burdick, J. & Wang, J. Carbon-Nanotube-Induced Acceleration of Catalytic Nanomotors. ACS Nano 2, 1069-1075 (2008).
48. Paxton, W. F. et al. Catalytic Nanomotors: Autonomous Movement of Striped Nanorods. J. Am. Chem. Soc. 126, 13424-13431 (2004).
49. Hong, Y., Diaz, M., Córdova-Figueroa, U. M. & Sen, A. Light-Driven Titanium-Dioxide-Based Reversible Microfireworks and Micromotor/Micropump Systems. Adv. Funct. Mater. 20, 1568-1576 (2010).
50. Sengupta, S. et al. Self-powered enzyme micropumps. Nat Chem 6, 415-422 (2014).
51. Ma, X., Hahn, K. & Sanchez, S. Catalytic Mesoporous Janus Nanomotors for Active Cargo Delivery. J. Am. Chem. Soc. 137, 4976-4979 (2015).
52. Wilson, D. A., Nolte, R. J. M. & van Hest, J. C. M. Autonomous movement of platinum-loaded stomatocytes. Nat Chem 4, 268-274 (2012).
53. Wang, W. et al. Acoustic Propulsion of Nanorod Motors Inside Living Cells. Angew. Chem. Int. Ed. 53, 3201-3204 (2014).
54. Li, J. et al. Magneto—Acoustic Hybrid Nanomotor. Nano Lett. 15, 4814-4821 (2015).
55. Kline, T. R., Paxton, W. F., Mallouk, T. E. & Sen, A. Catalytic Nanomotors: Remote-Controlled Autonomous Movement of Striped Metallic Nanorods. Angew. Chem. Int. Ed. 44, 744-746 (2005).
56. Tottori, S., Zhang, L., Peyer, K. E. & Nelson, B. J. Assembly, Disassembly, and Anomalous Propulsion of Microscopic Helices. Nano Lett. 13, 4263-4268 (2013).
57. Friese, M. E. J., Nieminen, T. A., Heckenberg, N. R. & Rubinsztein-Dunlop, H. Optical alignment and spinning of laser-trapped microscopic particles. Nature 394, 348-350 (1998).
58. Garces-Chavez, V., McGloin, D., Melville, H., Sibbett, W. & Dholakia, K. Simultaneous micromanipulation in multiple planes using a self-reconstructing light beam. Nature 419, 145-147 (2002).
59. Liu, C., Tang, J., Chen, H. M., Liu, B. & Yang, P. A Fully Integrated Nanosystem of Semiconductor Nanowires for Direct Solar Water Splitting. Nano Lett. 13, 2989-2992 (2013).
60. Kline, T. R. & Sen, A. Reversible Pattern Formation through Photolysis. Langmuir 22, 7124-7127 (2006).
61. Dreyfus, R. et al. Microscopic artificial swimmers. Nature 437, 862-865 (2005).
62. Loget, G. & Kuhn, A. Electric field-induced chemical locomotion of conducting objects. Nat Commun 2, 535 (2011).
63. Liu, C., Hwang, Y. J., Jeong, H. E. & Yang, P. Light-Induced Charge Transport within a Single Asymmetric Nanowire. Nano Lett. 11, 3755-3758 (2011).
64. Hwang, Y. J., Hahn, C., Liu, B. & Yang, P. Photoelectrochemical Properties of TiO2 Nanowire Arrays: A Study of the Dependence on Length and Atomic Layer Deposition Coating. ACS Nano 6, 5060-5069 (2012).

We claim:

1. A method for propelling a nanomotor comprising:
   immersing the nanomotor in an aqueous redox coupling fluid;
   providing energy from a light source directed at the nanomotor, wherein a portion of the nanomotor is illuminated by the light source while another portion of the nanomotor is shaded from the light source; and
   allowing photoelectrohemical reactions to generate charged ions at an interface between a surface of the nanomotor and the aqueous redox coupling fluid, creating an electric field in the vicinity of the nanomotor, the electric field being able to at least partially steer the motion of the nanomotor by electrophoresis in a defined trajectory, wherein the trajectory is determined by the polarity of the surface potential of one or more components of the nanomotor,
   wherein at least a portion of the nanomotor is chemically modified, wherein the modification is capable of altering the surface potential of the nanomotor, and
   wherein the modification is accomplished by using a material selected from 3-[2-(2-aminoethylamino)-ethylamino]-propyltrimethoxysilane (AEEA) and 2-(4-chlorosulfonylphenyl)ethyltrimethoxysilane (CSPTMS).

2. The method of claim 1, wherein an intensity and spatial location of the light source is adjustable.

3. The method of claim 1, wherein wavelength of the incident light produced by the light source ranges from 340 nm to 1400 nm.

4. The method of claim 1, wherein the nanomotor is a three-dimensional nanotree comprising a nanowire comprising a material selected from doped semiconductors, narrow-bandgap semiconductors, photoactive polymers, and biological molecules as a trunk of the nanotree and $TiO_2$ nanowires as branches of the nanotree, the $TiO_2$ nanowires being chemically grown at one end of the trunk and occupying a substantially cylinder-shaped space whose diameter is substantially larger than the diameter of the trunk.

5. The method of claim 4, wherein the trunk of the nanotree comprises p-type silicon.

6. The method of claim 4, wherein the nanotree comprises a reaction catalyst in the form of nanoparticles uniformly embedded on the surface of the trunk of the nanotree, the reaction catalyst being selected from platinum, gold, silver, palladium, iridium oxide, nickel oxide, and ruthenium oxide.

7. The method of claim 1, wherein the nanomotor comprises a core-shell silicon nanowire having a p-n junction, the core of the nanowire comprising p-type silicon and the shell of the nanowire comprising $n^+$-type silicon, wherein one end of the nanowire is fractured to expose the p-type silicon.

8. The method of claim 1, wherein the aqueous redox coupling fluid is selected from hydrogen peroxide and a mixture of benzoquinone and hydroquinone.

9. The method of claim 8, wherein the aqueous redox coupling fluid is the mixture of benzoquinone and hydroquinone.

10. A three-dimensional nanotree, comprising:
    a nanowire comprising a material selected from doped semiconductors, narrow-bandgap semiconductors, photoactive polymers, and biological molecules as a trunk of the nanotree; and
    $TiO_2$ nanowires as branches of the nanotree, the $TiO_2$ nanowires being chemically grown at one end of the trunk and occupying a cylinder-shaped space whose diameter is substantially larger than the diameter of the trunk,
    wherein the nanomotor is capable of being propelled by a light source having a wavelength ranging from 340 nm to 1400 nm, wherein the trunk and/or the branches of the nanotree is chemically modified, wherein the modification is capable of altering the surface potential of the nanotree, and wherein the modification is accomplished by using a material selected from 3-[2-(2-aminoethylamino)-ethylamino]-propyltrimethoxysilane (AEEA) and 2-(4-chlorosulfonylphenyl)ethyltrimethoxysilane (CSPTMS).

11. The nanotree of claim 10, wherein the trunk of the nanotree comprises p-type silicon.

12. The nanotree of claim 10, wherein the nanotree comprises a reaction catalyst in the form of nanoparticles uniformly embedded on a surface of the trunk of the nanotree, the reaction catalyst being selected from platinum, gold, silver, palladium, iridium oxide, nickel oxide, and ruthenium oxide.

13. A light-propelled nanomotor apparatus comprising:
a light source providing incident light, wherein wavelength of the incident light ranges from 340 nm to 1400 nm;
a nanomotor; and
an aqueous redox coupling fluid capable of facilitating photoelectrochemical reactions and selected from hydrogen peroxide and a mixture of benzoquinone and hydroquinone,
wherein at least a portion of the nanomotor is chemically modified with an agent selected from 3-[2-(2-aminoethylamino)-ethylamino]-propyltrimethoxysilane (AEEA) and 2-(4-chlorosulfonylphenyl)ethyltrimethoxysilane (CSPTMS), the modification being capable of altering the surface potential of the nanomotor.

14. The apparatus of claim 13, wherein the nanomotor is a nanotree comprising a nanowire comprising a material selected from doped semiconductors, narrow-bandgap semiconductors, photoactive polymers, and biological molecules as a trunk of the nanotree and $TiO_2$ nanowires as branches of the nanotree, the $TiO_2$ nanowires being chemically grown at one end of the trunk and occupying a cylinder-shaped space whose diameter is substantially larger than the diameter of the trunk.

15. The apparatus of claim 13, wherein the nanomotor comprises a core-shell silicon nanowire having a p-n junction, the core of the nanowire comprising p-type silicon and the shell of the nanowire comprising $n^+$-type silicon, wherein one end of the nanowire is fractured to expose the p-type silicon.

16. The apparatus of claim 14, wherein the nanotree comprises a reaction catalyst in the form of nanoparticles uniformly embedded on a surface of the trunk of the nanotree, the reaction catalyst being selected from platinum, gold, silver, palladium, iridium oxide, nickel oxide, and ruthenium oxide.

17. The apparatus of claim 14, wherein a trajectory of the nanotree with respect to the light source is determined by polarity of surface potential of one or more components of the nanotree and the polarity of surface potential of the overall nanotree.

18. The apparatus of claim 15, wherein speed of propulsion of the core-shell silicon nanowire is dependent upon the intensity of the incident light, the wavelength of the incident light, the extent of incident light absorbed by the core-shell silicon nanowire, and the ionic strength of the aqueous redox coupling fluid.

19. The method of claim 7, wherein the nanomotor comprises a reaction catalyst in the form of nanoparticles uniformly embedded on a surface of $n^+$-type silicon shell, the reaction catalyst being selected from platinum, gold, silver, palladium, iridium oxide, nickel oxide, and ruthenium oxide.

20. The apparatus of claim 13, wherein the aqueous redox coupling fluid is the mixture of benzoquinone and hydroquinone.

* * * * *